(12) United States Patent
Nakata

(10) Patent No.: US 9,374,803 B2
(45) Date of Patent: Jun. 21, 2016

(54) MESSAGE NOTIFICATION SYSTEM, MESSAGE TRANSMITTING AND RECEIVING APPARATUS, PROGRAM, AND RECORDING MEDIUM

(71) Applicant: DENSO CORPORATION, Kariya, Aichi-pref. (JP)

(72) Inventor: Tsuneo Nakata, Kariya (JP)

(73) Assignee: DENSO CORPORATION, Kariya (JP)

( * ) Notice: Subject to any disclaimer, the term of this patent is extended or adjusted under 35 U.S.C. 154(b) by 60 days.

(21) Appl. No.: 14/294,358

(22) Filed: Jun. 3, 2014

(65) Prior Publication Data

US 2014/0364088 A1 Dec. 11, 2014

(30) Foreign Application Priority Data

Jun. 5, 2013 (JP) .................................. 2013-119135

(51) Int. Cl.
| | |
|---|---|
| H04W 68/00 | (2009.01) |
| H04M 19/04 | (2006.01) |
| G06Q 10/10 | (2012.01) |
| H04L 12/58 | (2006.01) |

(52) U.S. Cl.
CPC ............ *H04W 68/005* (2013.01); *G06Q 10/10* (2013.01); *H04L 51/24* (2013.01)

(58) Field of Classification Search
CPC .................................................. H04W 68/005
USPC ....................................................... 455/412.2
See application file for complete search history.

(56) References Cited

U.S. PATENT DOCUMENTS

| | | | | |
|---|---|---|---|---|
| 6,049,698 A | * | 4/2000 | Capers, Jr. ........... | G06Q 10/109 340/7.1 |
| 6,108,688 A | * | 8/2000 | Nielsen ................ | G06Q 10/107 709/206 |
| 6,119,014 A | | 9/2000 | Alperovich et al. | |

(Continued)

FOREIGN PATENT DOCUMENTS

| | | |
|---|---|---|
| JP | 2004015300 A | 1/2004 |
| JP | 2007-255908 A | 10/2007 |

(Continued)

OTHER PUBLICATIONS

Office Action mailed Apr. 28, 2015 in the corresponding JP application No. 2013-119135 (English translation attached).

*Primary Examiner* — William Nealon
(74) *Attorney, Agent, or Firm* — Posz Law Group, PLC

(57) ABSTRACT

A message notification system includes a message transmitting apparatus and a message receiving apparatus. In the message transmitting apparatus, transmission data including an acquired message is generated and transmitted. In the message receiving apparatus, the transmission data is received. When the transmission data is received, the message receiving apparatus notifies a receiving-side user of the message in the transmission data. The message transmitting apparatus sets whether nor a receiving-side user is to be re-notified of the message in the transmission data, and sets a re-notification condition for re-notification of the message. When receiving the transmission data with the setting that re-notification is required, the message receiving apparatus stores the message in the transmission data in association with the re-notification condition of the message, determines whether or not the re-notification condition is met, and notifies the receiving-side user of the message which is determined that the re-notification condition is met.

13 Claims, 12 Drawing Sheets

<RE-NOTIFICATION LIST> L1

| ENTRY | RE-NOTIFICATION CONDITION | | | |
|---|---|---|---|---|
| | LOCATION | OTHER | RE-NOTIFICATION FREQUENCY | VALIDITY PERIOD |
| MESSAGE 001 | P1 (X1,Y1) | ··· | 1 | ··· |
| MESSAGE 002 | P2 (X2,Y2) | ··· | 1 | ··· |
| MESSAGE 004 | — | TIME | ∞ | ··· |
| ··· | ··· | ··· | ··· | ··· |

(56) References Cited

U.S. PATENT DOCUMENTS

| | | | |
|---|---|---|---|
| 6,721,784 B1* | 4/2004 | Leonard | H04L 51/18 709/204 |
| 7,305,441 B2* | 12/2007 | Mathewson, II | G06Q 10/109 709/206 |
| 8,009,035 B1* | 8/2011 | Vallaire | G08B 27/008 340/539.1 |
| 8,635,302 B2* | 1/2014 | Christensen | G06Q 30/02 370/301 |
| 8,719,348 B2* | 5/2014 | Bishop | H04L 12/587 709/206 |
| 8,799,369 B2* | 8/2014 | Bishop | G06Q 10/107 709/206 |
| 8,825,014 B2* | 9/2014 | Urbahns | H04M 1/72547 455/412.2 |
| 2006/0116142 A1* | 6/2006 | Cofta | H04L 12/587 455/466 |
| 2007/0066283 A1* | 3/2007 | Haar | H04W 4/12 455/412.2 |
| 2007/0239830 A1* | 10/2007 | Barnes | H04L 12/581 709/206 |
| 2008/0205602 A1* | 8/2008 | Bishop | G06Q 10/107 379/88.12 |
| 2008/0205610 A1* | 8/2008 | Bishop | H04L 51/24 379/93.24 |
| 2008/0255919 A1* | 10/2008 | Gorder | G06Q 10/06 705/7.13 |
| 2009/0036066 A1* | 2/2009 | Chiu | H04B 1/38 455/90.2 |
| 2009/0075632 A1* | 3/2009 | Urbahns | H04M 1/72547 455/412.2 |
| 2009/0111490 A1* | 4/2009 | Bell | H04M 1/72552 455/466 |
| 2009/0177736 A1* | 7/2009 | Christensen | G06Q 30/02 709/203 |
| 2009/0196576 A1* | 8/2009 | Watanabe | H04L 12/66 386/291 |
| 2010/0184484 A1* | 7/2010 | Lindberg | G04G 11/00 455/566 |
| 2012/0084668 A1* | 4/2012 | Rohnert | H04L 51/24 715/752 |
| 2012/0158905 A1* | 6/2012 | Christensen | G06Q 30/02 709/217 |
| 2013/0185369 A1* | 7/2013 | Bain | H04L 51/24 709/206 |
| 2014/0364088 A1* | 12/2014 | Nakata | H04W 68/005 455/412.2 |

FOREIGN PATENT DOCUMENTS

| | | |
|---|---|---|
| JP | 2011-237878 A | 11/2011 |
| JP | 2013070416 A | 4/2013 |

* cited by examiner

FIG.4

<RE-NOTIFICATION TABLE>

| RE-NOTIFICATION IDENTIFIER | RE-NOTIFICATION CONDITION |
|---|---|
| ! | PRIORITIZE OTHER CONDITIONS (IF NO OTHER CONDITIONS ARE PRESENT, DISTANCE BETWEEN POSITION AT TIME OF TRANSMISSION AND RECEIVING TERMINAL IS PREDETERMINED VALUE OR LESS) |
| BEWARE, DANGER | |
| HERE, THIS | DISTANCE BETWEEN POSITION AT TIME OF TRANSMISSION AND RECEIVING TERMINAL IS PREDETERMINED VALUE OR LESS |
| SPEED PER HOUR, SPEED | TRAVELING SPEED IS PREDETERMINED VALUE OR LESS OR HIGHER |
| PARKED ON THE SIDE OF THE ROAD | DISTANCE BETWEEN POSITION AT TIME OF TRANSMISSION AND RECEIVING TERMINAL IS PREDETERMINED VALUE OR LESS, AZIMUTH ANGLES MATCH, AND VALIDITY PERIOD IS ONE HOUR |
| TRAFFIC LANE | DISTANCE BETWEEN POSITION AT TIME OF TRANSMISSION AND RECEIVING TERMINAL IS PREDETERMINED VALUE OR LESS AND AZIMUTH ANGLES MATCH |
| X O'CLOCK | WITHIN PREDETERMINED AMOUNT OF TIME FROM X O'CLOCK |
| ... | ... |

<RE-NOTIFICATION LIST> L1

| ENTRY | RE-NOTIFICATION CONDITION | | RE-NOTIFICATION FREQUENCY | VALIDITY PERIOD |
|---|---|---|---|---|
| | LOCATION | OTHER | | |
| MESSAGE 001 | P1 (X1,Y1) | ... | 1 | ... |
| MESSAGE 002 | P2 (X2,Y2) | ... | 1 | ... |
| MESSAGE 004 | — | TIME | ∞ | ... |
| ... | ... | ... | ... | ... |

Msg5 「THIS IS THE LAST GAS STATION」
Msg6 「TURN RIGHT」
Msg7 「WAIT HERE IF IT IS SNOWING」
Msg8 「MOBILE PHONES ARE OUT OF RANGE BEYOND THIS POINT」

MESSAGE NOTIFICATION SYSTEM, MESSAGE TRANSMITTING AND RECEIVING APPARATUS, PROGRAM, AND RECORDING MEDIUM

CROSS-REFERENCE TO RELATED APPLICATION

This application is based on and claims the benefit of priority from Japanese Patent Application No. 2013-119135, filed Jun. 5, 2013, the disclosure of which is incorporated herein in its entirety by reference.

BACKGROUND

1. Technical Field

The present invention relates to a technology for notifying a user of a message received from another terminal.

2. Related Art

As a message transmitting and receiving apparatus that transmits and receives messages, and notifies a user of a message received from another terminal, there is, for example, an information terminal device (referred to, hereinafter, as a message transmitting and receiving apparatus) disclosed in JP-A-2007-255908. The message transmitting and receiving apparatus described in JP-A-2007-255908 attaches navigation information to a message inputted by a user and transmits the message. The navigation information is information related to an arbitrary location set by user input. The navigation information includes various types of information related to a location, such as a destination, a location on a route, the current location, other arbitrary locations designated by the user, or and a guidance route to a destination.

A message transmitting and receiving apparatus on the receiving side receives the transmitted data. The message transmitting and receiving apparatus then displays the message together with a map image on a display. The map image corresponds to the navigation information included in the transmitted data.

The message transmitting and receiving apparatus described in JP-A-2007-255908 has a so-called chat function that enables messaging among a plurality of users in real-time. The chat function is used to transmit information including as greetings, such as "Good job!", and other various types of content.

Among the messages exchanged among users, compared to greetings such as "Good job!", some messages have a stronger correlation to elements such as location, time, and weather. For example, a message that prompts caution during driving, such as "Watch out for pedestrians here", is strongly correlated with the location indicated by "here" in the message. Therefore, the information contained in the message is more effectively used if the user is notified of the message while in a position where caution is actually needed (in other words, a position near the location indicated by "here"), rather than when the user is notified while in a position relatively far from the location indicated by "here".

In other words, the user is preferably notified of a message that includes content indicating a certain situation, such as a location, time, or weather, at a timing at which the situation indicated by the message is occurring or is about to occur.

In the message transmitting and receiving apparatus described in JP-A-2007-255908, when a message is received, the user on the receiving side receives notification of the message at the time of reception. After the notification accompanying reception is performed, even when a situation occurs in which the message becomes more useful to the user than at the time of reception, notification is not performed at this time. Therefore, if there is a time lag from when the message is received to when the situation occurs in which the message becomes more useful to the user than at the time of reception, the user may no longer remember the information in the message.

SUMMARY

It is thus desired to provide a message notification system, a message transmitting and receiving apparatus, a program, and a recording medium in which a user is notified again of a received message when the message becomes more useful to the user than at the time of reception.

A first exemplary embodiment provides a message notification system that includes a message transmitting apparatus and a message receiving apparatus.

The message transmitting apparatus includes: message input means that enables a transmitting-side user to input a message; message acquiring means that acquires the message inputted by the transmitting-side user via the message input means; transmission data generating means that generates transmission data including the message; and transmitting means that transmits the transmission data generated by the transmission data generating means.

The message receiving apparatus includes: receiving means that receives the transmission data transmitted by the message transmitting apparatus; and first message notifying means that notifies, when the receiving means receives the transmission data, a receiving-side user of the message included in the transmission data received by the receiving means.

The message transmitting apparatus further includes: first setting means (re-notification required/not-required setting means) that sets whether nor not the receiving-side user is to be re-notified of the message included in the transmission data; and second setting means (re-notification condition setting means) that sets, when the first setting means sets that the receiving-side user is to be re-notified of the message, a re-notification condition that is a condition for re-notification of the message, and is a condition that is correlated with the content of the message and is used to determine a state in which the message becomes more useful than at the time of message transmission. The transmission data further includes: data indicating whether or not re-notification is required that is set by the re-notification required/not-required setting means; and data indicating the re-notification condition when the first setting means sets that the receiving-side user is to be re-notified of the message.

The message receiving apparatus further includes: first storage means that stores, when the receiving means receives the transmission data with the setting that re-notification is required, the message included in the transmission data in association with the re-notification condition of the message; re-notification condition met/not-met determining means (determining means) that determines whether or not the re-notification condition stored in the first storage means is met; and second message notifying means that re-notifies the receiving-side user of the message of which the determining means has determined the re-notification condition is met.

In the above-described configuration, a condition for re-notification (re-notification condition) is written in the transmission data when re-notification of the message included in the transmission data is to be performed. When the transmission data with the setting that re-notification is required is received, the message receiving apparatus stores, in a storage unit, the message in association with the re-notification data.

When the determining means determines that the re-notification condition is met, the message receiving apparatus re-notifies the user of the message.

Therefore, notification of the message to which the re-notification condition is attached is performed not only at the time of reception, but also when the re-notification condition is met. Here, the re-notification condition is set using information that has correlation with the content of the message. The re-notification condition is set such that re-notification is performed at a time point at which the message is more useful than at the time of reception. As a result, the message receiving apparatus can perform re-notification of a message when the message becomes more useful to the user than at the time of reception.

A second exemplary embodiment provides a message transmitting and receiving apparatus includes the respective means of the message transmitting apparatus and the message receiving apparatus.

A third exemplary embodiment provides a program enables a computer to function as the message acquiring means, the transmission data generating means, the transmitting means, the receiving means, the first message notifying means, the first setting means, the second setting means, the determining means, and the second message notifying means.

A fourth exemplary embodiment provides a recording medium records therein a program for enabling a computer to function as the message acquiring means, the transmission data generating means, the transmitting means, the receiving means, the first message notifying means, the first setting means, the second setting means, the determining means, and the second message notifying means.

BRIEF DESCRIPTION OF THE DRAWINGS

In the accompanying drawings:

FIG. 4 is a diagram showing an example of a re-notification table used in the transmission process shown in FIG. 3;

DESCRIPTION OF THE EMBODIMENTS

First Embodiment

Figure 1:
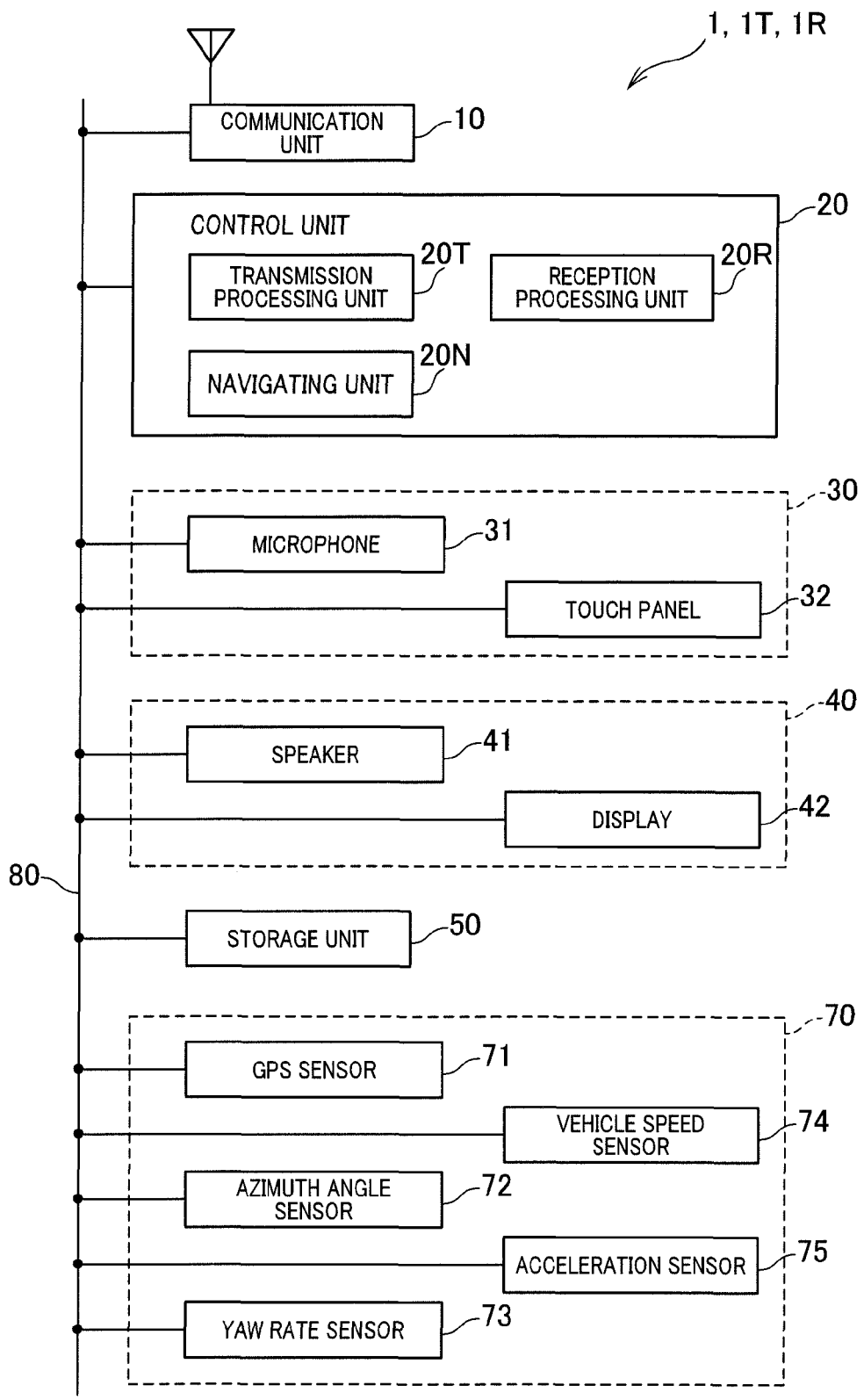
FIG. 1 is a block diagram showing a configuration of a message transmitting and receiving apparatus according to a first embodiment.

A message transmitting and receiving apparatus 1 according to a first embodiment of the present invention will be described with reference to FIG. 1 to FIG. 14. According to the first embodiment, the message transmitting and receiving apparatus 1 is mounted in a vehicle. An example of an overall configuration of the message transmitting and receiving apparatus 1 is shown in FIG. 1. The user of the message transmitting and receiving apparatus 1 is described under an assumption that the user is the driver of the vehicle in which the message transmitting and receiving apparatus 1 is mounted. However, the user may also be a passenger in the vehicle.

As shown in FIG. 1, the message transmitting and receiving apparatus 1 includes a communication unit 10, a control unit 20, an input unit 30, an output unit 40, a storage unit 50, and a detecting unit 70. The control unit 20 is connected to the communication unit 10, the input unit 30, the output unit 40, the storage unit 50, and the detecting unit 70 by an in-vehicle local area network (LAN) 80. The in-vehicle LAN 80 is based on a communication protocol, such as a controller area network (CAN).

The input unit 30 is a device that receives input from the user. The input unit 30 includes a microphone 31 and a touch panel 32. The microphone 31 is a compact microphone for in-vehicle use. The microphone 31 converts speech that has been spoken by the user into electrical signals. The microphone 31 then outputs the electrical signals to the control unit 20. The touch panel 32 is laminated onto a display panel of a display 42, described hereafter. The touch panel 32 successively (such as every 20 milliseconds) detects a position on the touch panel 32 that has been touched by the user. The touch panel 32 then outputs the detection results to the control unit 20. A capacitance-type touch panel is used as the touch panel 32 according to the first embodiment. However, other touch panels, such as a pressure-sensitive type, may be used. In addition, a configuration in which the microphone 31 and the touch panel 32 are used as the input unit 30 is given as an example herein. However, the input from the user may be received by other known input devices, such as a mechanical switch or gesture-input. The input unit 30 is equivalent to message input means (message input unit) recited in the present disclosure.

The output unit 40 is a device that notifies the user of a message that has been transmitted from another user. The output unit 40 includes a speaker 41 and the display 42. The speaker 41 converts the electrical signals inputted from the control unit 20 to sound and outputs the sound.

The display 42 displays text and images based on input from the control unit 20. The display 42 thereby notifies the driver of various pieces of information. The display 42 is, for example, disposed in the center of an instrument panel or within a combination meter provided in front of the driver's seat. For example, the display 42 is capable of full-color display. The display 42 can be configured using a thin film transistor (TFT) liquid crystal display, an organic electroluminescent (EL) display, or the like. The touch panel 32 is laminated onto the display panel included in the display 42.

The storage unit 50 is configured by, for example, a hard disk drive (HDD). The storage unit 50 stores therein various pieces of data, such as map data and facility data, used by a navigating unit 20N, described hereafter. In addition, the storage unit 50 stores therein received messages and the like based on commands from the control unit 20. A re-notification list L1 and a re-notification table T1, described hereafter, are also provided in a storage area that is included in the storage unit 50.

The storage unit 50 may be actualized by a non-volatile memory. The storage unit 50 may be a solid state drive (SSD), a secure digital (SD) card, or the like. The storage unit 50 may also be configured by a combination of a plurality of types of storage media. The storage unit 50 is configured so as not to delete stored data unless, for example, an instruction for deletion is given by user operation. The storage unit 50 is equivalent to first storage means (first storage unit), second storage means (second storage unit), and a recording medium recited in the present disclosure. Programs are recorded in the recording medium to enable a computer to function as the message transmitting and receiving apparatus 1.

The detecting unit 70 includes various sensors that are mounted in the vehicle. For example, the detecting unit 70 includes a global positioning system (GPS) sensor 71, an azimuth angle sensor 72, a yaw rate sensor 73, a vehicle speed sensor 74, and an acceleration sensor 75. In addition to the sensors 71 to 75, a sensor for detecting the remaining amount of gasoline (or battery in the instance of an electric car), a temperature sensor, and the like (not shown) are connected to the in-vehicle LAN 80 and included in the detecting unit 70. The detecting unit 70 is equivalent to detecting means (detecting unit or detector) recited in the present disclosure.

The GPS sensor 71 receives signals transmitted from a GPS satellite. Based on the received signals, the GPS sensor 71 successively acquires the coordinates (latitude and longitude) of the current position. The coordinate acquisition interval is, for example, every 200 milliseconds. The data indicating the coordinates of the current position acquired by the GPS sensor 71 is successively outputted to the control unit 20.

The azimuth angle sensor 72 detects the traveling direction (referred to, hereinafter, as the azimuth angle) of the own vehicle. According to the first embodiment, a geomagnetic sensor is used as an example of the azimuth angle sensor 72. A gyro sensor may also be used as the azimuth angle sensor 72. When the gyro sensor is used, the azimuth angle of the own vehicle may be determined by integrating the angular rate of change (rad/sec) outputted by the gyro sensor.

The yaw rate sensor 73 detects the angular velocity (yaw rate) around a vertical axis of the own vehicle. The information on the detected yaw rate is transmitted over the in-vehicle LAN 80. The vehicle speed sensor 74 detects the speed of the own vehicle. For example, a wheel speed sensor may be used as the vehicle speed sensor 74. The wheel speed sensor detects the rotation speed of the tires. The speed of the vehicle may then be determined from an output value of the wheel speed sensor. The acceleration sensor 75 detects the acceleration of the own vehicle. A known acceleration sensor may be used as the acceleration sensor 75. Alternatively, the acceleration may be determined by determining a time-derivative of the speed detected by the vehicle speed sensor 74.

Figure 2:
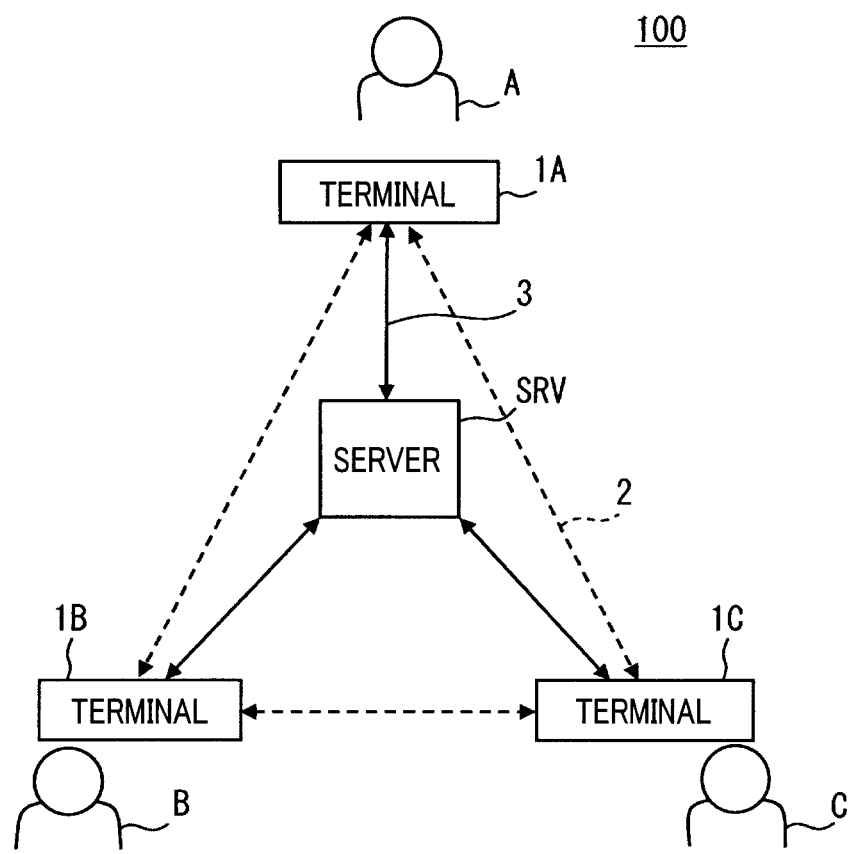
FIG. 2 is a block diagram showing a configuration of a message notification system including the message transmitting and receiving apparatus shown in FIG. 1.

The communication unit 10 includes a transmission and reception antenna. The communication unit 10 performs communication with other message transmitting and receiving apparatuses 1 and a server SRV using wireless communication. The server SRV is provided externally. A conceptual diagram of a system (message notification system 100) including a plurality of message transmitting and receiving apparatuses 1 and the server SRV is shown in FIG. 2. In FIG. 2, to differentiate among the plurality of message transmitting and receiving apparatuses 1, the message transmitting and receiving apparatuses are respectively given the reference numbers 1A, 1B, and 1C. The server SRV is used to manage and operate the message notification system 100 that includes the message transmitting and receiving apparatuses 1.

The communication unit 10 may communicate with the message transmitting and receiving apparatus 1 that is mounted in another vehicle, via the server SRV. Alternatively, the communication unit 10 may directly transmit and receive data to and from the message transmitting and receiving apparatus 1 that is mounted in another vehicle, using peer-to-pear (P2P) communication. For P2P communication, a hybrid P2P system may be used in which P2P communication is started after search and authentication of a peer message transmitting and receiving apparatus 1 is performed by the server SRV. Alternatively, a pure P2P system may be used that starts P2P communication without going through the server SRV. These communication systems are separately used depending on the application run by the message transmitting and receiving apparatus 1. When P2P communication is performed, the message transmitting and receiving apparatuses 1A to 1C are capable of directly transmitting and receiving information to and from one another without going through the server SRV, as indicated by the broken lines in FIG. 2.

Hereafter, the message transmitting and receiving apparatus 1 serving as the transmitting side in the transmission and reception of messages is referred to as a transmitting terminal 1T. The message transmitting and receiving apparatus 1 serving as the receiving side is referred to as a receiving terminal 1R. Therefore, the transmitting terminal 1T is equivalent to a message transmitting apparatus recited in the present disclosure. The receiving terminal 1R is equivalent to a message receiving apparatus. However, according to the first embodiment, the message transmitting and receiving apparatus 1 includes both the function as the transmitting terminal 1T and the function as the receiving terminal 1R.

In addition, the communication unit 10 includes a known frequency modulation (FM) tuner, a beacon receiver, a dedicated communication card, and the like. The communication unit 10 receives road and traffic information, such as information on traffic jams, that are delivered from a vehicle information communication system (VICS; registered trademark), and other types of information.

The control unit 20 is configured as a typical computer. The control unit 20 includes therein a known central processing unit (CPU), a memory, such as a read-only memory (ROM), a random access memory (RAM), or an electrically erasable programmable ROM (EEPROM), an input and output (I/O), a bus line that connects these components, and the like (not shown). The control unit 20 performs various processes as a result of the CPU executing programs stored in the ROM in advance, based on various pieces of information inputted from the communication unit 10, the input unit 30, and the various sensors 71 to 75 included in the detecting unit 70. As shown in FIG. 1, the control unit 20 includes a navigating unit 20N, a transmission processing unit 20T, and a reception processing unit 20R as functional blocks.

The navigating unit 20N provides a route guidance function which is ordinarily provided in a typical navigation device. The route guidance function provides guidance in conjunction with the output unit 40 such that the route from a current location to a destination set by the user is calculated using map data and the like stored in the storage unit 50. The vehicle then travels the calculated route. For example, the route guidance function provides guidance, such as the distance to the next intersection, the direction in which to travel at the intersection, and the traffic lane to be traveled.

The transmission processing unit 20T performs a transmission process described hereafter. The reception processing unit 20R performs a reception process described hereafter. In addition to the above-described functions, the control unit 20 performs a process for generating image data to be displayed in the display 42 and a process for generating sound data to be outputted from the speaker 41. Furthermore, when re-notification of a received message is required, the control unit 20 also performs a re-notification process described hereafter.

Here, a series of processing operations performed by the control unit 20 will be described with reference to the flowchart in FIG. 3. In the series of processing operations, the control unit 20 generates transmission data to be transmitted to the receiving terminal 1R and transmits the transmission data via the communication unit 10 (referred to, hereinafter, as the transmission process). The process shown in the flowchart in FIG. 3 may be configured to be started when the user performs an operation to input a message through the input unit 30. As the operation for inputting a message, for example, the control unit 20 detects that the user has touched a software switch (referred to, hereinafter, as simply a switch) for inputting a message that is displayed in the display 42.

At step S10, the control unit 20 acquires a message inputted by the user through the input unit 30. For example, when the user operation for inputting a message via the touch panel 32 is received, the control unit 20 displays switches in the display 42. The switches correspond to characters, such as hiragana or the alphabet. The user sequentially touches the switches that correspond to the characters and are displayed in the display 42. When message input is completed, the user may touch a switch indicating that message input is completed.

The control unit 20 successively determines the characters selected by the user from the positions on the screen that are touched by the user. The control unit 20 stores the determined characters. Then, when the user operation indicating that the input has been completed is received, the control unit 20 acquires the series of character strings as a message. Conversion from hiragana to kanji may be performed accordingly using known technology. Dictionary data to be used in this instance is stored in the storage unit 50.

In addition, when the user inputs a message via the microphone 31, the speech inputted into the microphone 31 is converted into character strings using a known speech recognition technology. The converted character strings serve as the message. Databases and the like used for speech recognition may be stored in the storage unit 50. The control unit 20 that performs the processing operation at step S10 is equivalent to message acquiring means (message acquiring unit) recited in the present disclosure.

At step S11, the control unit 20 sets whether or not re-notification of the message acquired at step S10 is required. Here, re-notification refers to second and subsequent notifications following the initial notification performed at the time of reception. Whether or not re-notification of the message is required is set by user input, according to the first embodiment. More specifically, the control unit 20 displays switches in the display 42 for selecting whether or not re-notification is required. When re-notification is required, the user touches a switch to set that re-notification is to be performed. When re-notification is not required, the user touches a switch to set that re-notification is to not be performed. The control unit 20 determines whether or not re-notification of the message is required from the position that is touched by the user.

Whether or not re-notification is required is set by user input, according to the first embodiment. However, as another configuration, the control unit 20 may automatically perform the setting based on the content of the message. When whether or not re-notification is required is automatically set, for example, the control unit 20 determines whether or not a character string that matches a re-notification identifier is included in the character strings composing the message. The re-notification identifier is composed of one or more codes, as indicated in the re-notification table T1 in FIG. 4. When the message includes a re-notification identifier that is included in the re-notification table T1, the control unit 20 sets that re-notification is required. The re-notification identifier may be a character string such as "here", or may be single symbol such as "!". For example, when the character "!" is included in the message, the control unit 20 sets that re-notification of the message is required. The control unit 20 that performs the processing operation at step S11 is equivalent to first setting means (first setting unit, re-notification required/not-required setting means or unit) recited in the present disclosure.

When set at step S11 that re-notification of the message is required, the control unit 20 determines YES at step S12 and proceeds to step S13. On the other hand, when set at step S11 that re-notification of the message is not required, the control unit 20 determines NO at step S12 and proceeds to step S14.

At step S13, the control unit 20 sets a condition (re-notification condition) for performing re-notification of the message acquired at step S10. The re-notification condition is related to the content of the message of which re-notification is to be performed. The re-notification condition enables the receiving terminal 1R to determine a state in which the message has become more useful than at the time of transmission. The types of information used as the re-notification condition are navigation information, vehicle information, user information, and external information.

The navigation information includes location information and route information. The location information indicates the position of a location. The route information indicates a route from a certain location to a destination. The location written in the location information is, for example, the current location of the transmitting terminal 1T, a registered location, a destination, or a location to be visited on the route. The location information is written as coordinates indicating the position of a certain location. For example, when the location information is used as the re-notification condition, the re-notification condition may be that the distance between the location (set location) written in the location information and the position of the receiving terminal 1R is a predetermined distance (such as 50 m) or less. The set location may be set by user input or may be automatically set by a procedure described hereafter.

The vehicle information is information related to the state of the vehicle, such as the traveling speed, azimuth angle, acceleration, yaw rate, engine rotation frequency, remaining amount of gasoline, engine coolant temperature, cumulative travel distance, shift position, direction indicator, door-lock state, and light-illumination state. For example, when vehicle speed is used as the vehicle information in the re-notification condition, the re-notification condition may be when the vehicle speed is 40 km/h or higher.

The user information is information related to the driver. The user information includes the current mood and physical condition of the user, driving skills, and the like. The mood and physical condition may be acquired by user input before the start of traveling. The information regarding driving skills indicates whether the driver is a novice driver or an experienced driver. Regarding the driving skills, information may be acquired by user input. Alternatively, the control unit 20 may determine the driving skills based on the total travel distance, the frequency of sudden acceleration, and the like.

In addition, as another configuration, a camera may be included in the vehicle. The camera captures the face of the driver. In this instance, when the driver is detected as looking away or dozing while driving, based on the movement of the eyes of the driver, the behavior of the user, such as looking away or dozing, may be used as the user information. As a technology for detecting that the user is looking away, known technologies may be used accordingly. The external information indicates time, weather, and traffic information, such as information related to traffic jams, that is acquired from VICS (registered trademark).

The re-notification condition includes a validity period. A reason for this is that the usefulness of the information in the message may be lost with the elapse of time. For example, the usefulness of a message "A car is parked on the side of the road here" is temporary. In other words, when a car that is parked on the side of the road is present "here" (location indicated in the message), the recipient of the message can make decisions, such as to change the traffic lane in which the recipient is traveling, by receiving the message. Therefore, the message is useful to the recipient. However, the possibility is high that, after several hours have passed from when the message has been created, the parked car is no longer there and the usefulness of the message is lost. In fact, because a message is displayed that indicates a situation that differs from the current situation, the driver who has received the re-notification may experience annoyance. Therefore, as a result of the re-notification condition of a message being provided with a validity period, the risk of a message being displayed that differs from the actual situation can be reduced.

Furthermore, a re-notification frequency is set for the re-notification condition. The re-notification frequency indicates the upper limit of the number of times re-notification is performed. For example, when the re-notification frequency is set to once, re-notification is performed only once. If the initial notification performed at the time of reception is also counted, notification of the message is performed a total of two times. The re-notification frequency may be set to "unlimited ($=\infty$)". When the re-notification frequency is set to unlimited, re-notification of the message is performed every time the re-notification condition is met. The re-notification frequency being set to zero may indicate that re-notification of the message is unnecessary.

The re-notification condition described above may be set manually. Alternatively, the re-notification condition may be set automatically in adherence to rules provided in advance. When the re-notification condition is set automatically, the control unit 20 may determine the type of information to be used as the re-notification condition from the character strings included in the message. In this instance, the control unit 20 uses the re-notification identifiers in the re-notification table T1 that is used at step S11 to automatically set whether or not re-notification is required. Upon determining the type of information to be used as the re-notification condition, the control unit 20 may then determine the kind of condition by analyzing the message.

For example, when the content of the message is "A car is parked on the side of the road here", based on the character string "here", the control unit 20 determines that the current position information of the transmitting terminal 1T is to be used. In other words, the current position serves as the set location. The re-notification condition is when the distance between the set location and the position of the receiving terminal 1R is within a predetermined distance. In addition, based on the character string "parked on the side of the road", the control unit 20 may set the validity period to one hour from the time of transmission of the message. Furthermore, whether or not a car is parked on the side of the road does not affect traffic lanes in the direction opposite to the traffic lane in which the car is parked. Therefore, the azimuth angle being equivalent to the azimuth angle of the transmitting terminal 1T at the time of transmission may be added to the re-notification condition.

When a plurality of re-notification conditions are set, the re-notification conditions are determined by logical AND. When all re-notification conditions are met, re-notification is performed.

In addition, depending on the application being used by the message transmitting and receiving apparatus 1, the type of information to be used as the re-notification condition may be restricted in advance. For example, if the application uses only a re-notification condition that the distance between the position of the transmitting terminal 1T and the position of the receiving terminal 1R at the time of transmission is a predetermined value or less, when the setting is that re-notification is required, the position of the transmitting terminal 1T may be automatically acquired, and the above-described re-notification condition may be set. In other words, the method for setting the re-notification condition may be designed accordingly depending on how the message transmitting and receiving apparatus 1 is used.

When the re-notification condition is set manually, the control unit 20 displays a plurality of switches for selecting the re-notification condition in the display 42. The user touches the switch corresponding to the desired re-notification condition. The control unit 20 determines the selected switch from the position that is touched by the user. The control unit 20 then sets the re-notification condition corresponding to the switch. An audio guidance for setting the re-notification condition may also be outputted from the speaker 41. The re-notification condition may then be set by user speech via the microphone 31. The control unit 20 that performs the processing operation at step S13 is equivalent to second setting means (second setting unit, re-notification condition setting means or unit) recited in the present disclosure.

At step S14, the control unit 20 generates transmission data to be transmitted to another message transmitting and receiving apparatus 1. The transmission data includes the message acquired by user input and a flag indicating whether or not re-notification of the message is required. When re-notification of the message is required, the transmission data also includes the re-notification condition. The control unit 20 that performs the processing operation at step S14 is equivalent to transmission data generating means (transmission data generating unit or transmission data generator) recited in the present disclosure.

Figure 5:
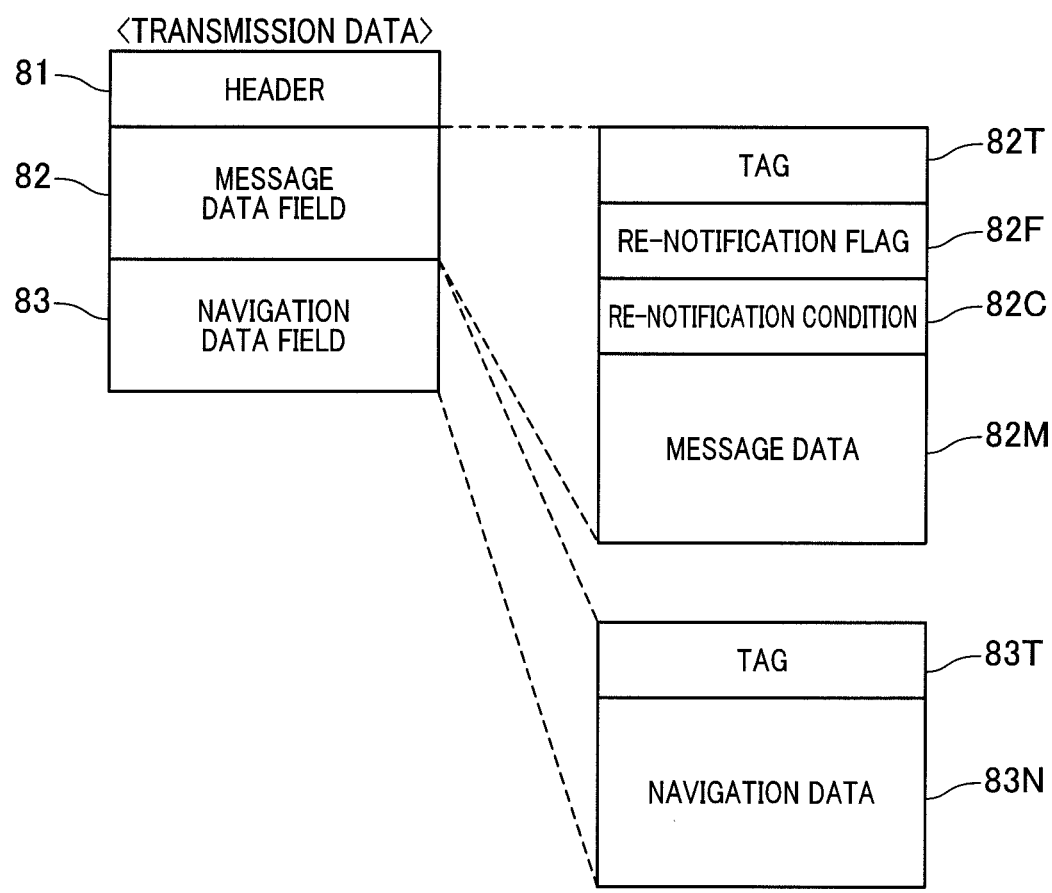
FIG. 5 is a diagram showing an example of a configuration of transmission data generated in the transmission process shown in FIG. 3.

Here, an example of a configuration of the transmission data will be described with reference to FIG. 5. The configuration shown in FIG. 5 is merely an example. The transmission data may be designed accordingly. As shown in FIG. 5, transmission data 8 includes a header 81, a message data field 82, and a navigation data field 83. In the header 81, an identification number (identification information) for identifying the transmitting terminal 1T, the destination of the transmission data 8, the size of the transmission data 8, the time at which the transmission data 8 was created, and the like are written. As identification information that indicates the transmitting terminal 1T, the address of the transmitting terminal 1T on a network or a device number that is uniquely assigned to the transmitting terminal 1T may be used. In addition, as the destination of the transmission data 8, the address of the receiving terminal 1R on a network or a device number may be used.

The message data field 82 is mainly an area in which the message inputted by the user is written. More specifically, the message data field 82 includes a tag 82T, a re-notification flag 82F, a re-notification condition 82C, and message data 82M. In the tag 82T, the size of the message data field 82 is written.

The re-notification flag 82F indicates whether or not re-notification of the message is required. The receiving terminal 1R determines whether or not re-notification of the message included in the transmission data 8 is required based on the re-notification flag 82F. For example, when re-notification is required, "1" is inserted in the re-notification flag 82F. When re-notification is not required, "0" is inserted in the re-notification flag 82F. In the re-notification condition 82C, the re-notification condition set at step S13 is written. When the route information is used for the re-notification condition, the route information is attached to the area of the navigation data 83N, described hereafter. When set at step S12 that re-notification is not required, for example, NULL is inserted in the area of the re-notification condition 82C. In the message data 82M, the message acquired at step S10 is written.

The navigation data field 83 is mainly an area in which the navigation information is written. The navigation data field 83 is attached to the transmission data 8 only when navigation information to be transmitted is present as a result of user input. The navigation data field 83 includes a tag 83T and the navigation data 83N. In the tag 83T, the type of navigation data 83N written in the navigation data field 83 and the size of the navigation data field 83 are written. In the navigation data 83N, data and route information using the map data and the facility data stored in the storage unit 50 are written. The navigation data 83N attached to the transmission data 8 is determined by user input.

At step S15, the control unit 20 outputs the transmission data generated at step S14 to the communication unit 10. The control unit 20 transmits the transmission data to the receiving terminal 1R and ends the transmission process.

Figures 6, 7:
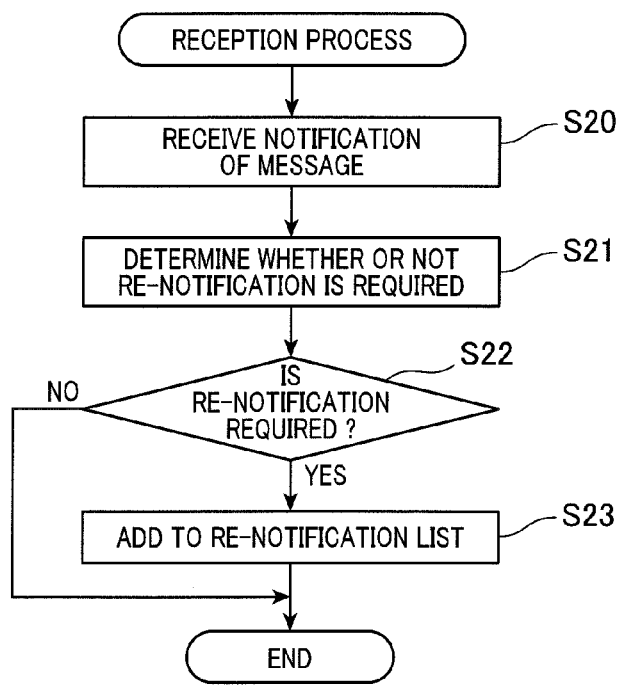
FIG. 6 is a flowchart showing a flow of a reception process performed by the control unit shown in FIG. 1.
FIG. 7 is a diagram showing an example of a configuration of a re-notification list constructed in a storage unit shown in FIG. 1.

Next, a series of processing operations will be described with reference to the flowchart in FIG. 6. The series of processing operations are performed when the receiving terminal 1R receives the transmitted transmission data (referred to, hereinafter, as the reception process). The process shown in the flowchart in FIG. 6 may be configured to be started when the transmission data is received via the communication unit 10.

At step S20, the control unit 20 of the receiving terminal 1R extracts the message from the received transmission data and displays the message in the display 42. In addition, the control unit 20 outputs the sound of the content of the message from the speaker 41. The control unit 20 that performs the processing operation at step S20 is equivalent to first message notifying means (first message notifying unit) recited in the present disclosure.

At step S21, the control unit 20 references the re-notification flag 82F and determines whether or not re-notification of the message is required. When determined that re-notification of the message is required, the control unit 20 determines YES at step S22 and proceeds to step S23. On the other hand, when determined that re-notification of the message is not required, the control unit 20 determines NO at step S22 and ends the reception process.

At step S23, the control unit 20 stores the message in a re-notification list L1 in association with the re-notification condition written in the re-notification condition 82C. The control unit 20 then ends the reception process. As shown in FIG. 7, the re-notification list L1 includes an area for storing the message (entry column in FIG. 7) and an area for storing the re-notification condition. The message is stored in association with the re-notification condition.

In addition, a series of processing operations will be described with reference to the flowchart in FIG. 8. The series of processing operations are performed when the control unit 20 performs re-notification of the message (referred to, hereinafter, as a re-notification process). The re-notification process is performed at a predetermined interval (such as every 100 milliseconds).

At step S30, the control unit 20 acquires determination information from the detecting unit 70, the storage unit 50, and the like via the in-vehicle LAN 80. The determination information is information used to determine whether or not the re-notification condition is met. The determination information indicates the navigation information, vehicle information, user information, and external information. For example, the control unit 20 acquires the current position of the own vehicle from the GPS sensor 71. In addition, not all of the above-described types of information are required to be collected. The control unit 20 may reference the re-notification list L1 and acquire the information necessary for determining whether or not the current re-notification conditions that are stored in the re-notification list L1 are met.

At step S31, the control unit 20 retrieves an entry of which the re-notification condition is met from the re-notification list L1. The control unit 20 retrieves the entry based on the determination information acquired at step S30. Here, when a message of which the re-notification condition is met is present, the control unit 20 determines YES at step S32 and proceeds to step S33. When an entry of which the re-notification condition is met is not present, the control unit 20 determines NO at step S32 and ends the re-notification process. The control unit 20 that performs the processing operation at step S32 is equivalent to re-notification condition met/not-met determining means (determining means) recited in the present disclosure.

At step S33, the control unit 20 displays the message in the display 42. The message is that of which the re-notification condition has been determined to be met at step S31 and step S32. In addition, the control unit 20 outputs the sound of the content of the message from the speaker 41 using a known read-out technology. As a result, the control unit 20 re-notifies the user. The control unit 20 that performs the processing operation at step S33 is equivalent to second message notifying means (second message notifying unit) recited in the present disclosure.

At step S34, the control unit 20 determines whether or not the message of which re-notification has been performed at step S33 is to be deleted. The control unit 20 may determine whether or not to delete the message by referencing the re-notification frequency included in the re-notification condition of each message. When determined at step S34 that the message is to be deleted, the control unit 20 determines YES at step S34 and proceeds to step S35. When determined at step S34 that the message is not to be deleted, the control unit 20 determines NO at step S34 and ends the re-notification process. At step S35, the control unit 20 deletes the message from the re-notification list L1 and ends the re-notification process. Entries that have passed the validity period may be deleted accordingly, for example, at the retrieval step at step S31.

(First Usage Example of the Message Transmitting and Receiving Apparatus According to the First Embodiment)

Here, an example is given in which the message transmitting and receiving apparatus 1 is used for communication when a plurality of users A to C are moving as a group. The users A to C are each driving a different vehicle. The message transmitting and receiving apparatus 1 is mounted in each vehicle. To differentiate among the message transmitting and receiving apparatuses 1 that are mounted in the vehicles, for convenience, the message transmitting and receiving apparatus 1 mounted in the vehicle driven by user A is referred to as the message transmitting and receiving apparatus 1A. The message transmitting and receiving apparatus 1 mounted in the vehicle driven by user B is referred to as the message transmitting and receiving apparatus 1B. The message transmitting and receiving apparatus 1 mounted in the vehicle driven by user C is referred to as the message transmitting and receiving apparatus 1C.

The users A to C driving the respective vehicles or passengers of the vehicles operate the respective message transmitting and receiving apparatuses 1A to 1C, and exchange messages in real-time (so-called chat). For example, the transmission data transmitted from the message transmitting and receiving apparatus 1A is received by the message transmitting and receiving apparatuses 1B and 1C. The users B and C are notified of the message included in the transmission data. The messages during chat are transmitted only to users that are set as a group (specifically, only the message transmitting and receiving apparatuses 1 used by the users). Communication among the message transmitting and receiving apparatuses 1 that are respectively mounted in the vehicles may be performed, for example, by P2P communication, as indicated by the dotted lines in FIG. 2.

As described above, the users A to C are moving as a group. Here, the users A to C are moving towards a shared destination P. Sharing of the destination P is performed by the user A transmitting the transmission data 8 in which the position of the destination P is attached to the navigation data 83N, as disclosed in JP-A-2007-255908. Each of the message transmitting and receiving apparatuses 1A to 1C successively (such as every 200 milliseconds) transmits the current position separately from the transmission data. As a result, the message transmitting and receiving apparatuses 1A to 1C share the respective positions.

In addition, the user A and the user C are using the route guidance function of the navigating unit 20N included in the message transmitting and receiving apparatuses 1A and 1C. The user A and the user C are each moving towards the destination P in adherence to the guidance by the navigating unit 20N. In other words, the user A and the user C receive guidance regarding intersections at which to turn, traffic lanes to be traveled, and the like. A state in which the own vehicle is traveling with use of the route guidance function of the message transmitting and receiving apparatus 1 included in the own vehicle is referred to as an independent cruising mode.

On the other hand, the user B is not using the route guidance function of the message transmitting and receiving apparatus 1B. The user B is using a tracking cruising function. In the tracking cruising function, the user B tracks and travels the travel trajectory of the vehicle driven by the user A. When a vehicle is traveling with use of the tracking cruising function, guidance regarding intersections at which to turn and the like is performed such as to follow the trajectory of the vehicle to be tracked. However, assistance such as guidance regarding traffic lanes in which to travel is not performed. A state in which a vehicle is traveling with use of the tracking cruising function as described above is referred to as a tracking cruising mode.

Figure 9:
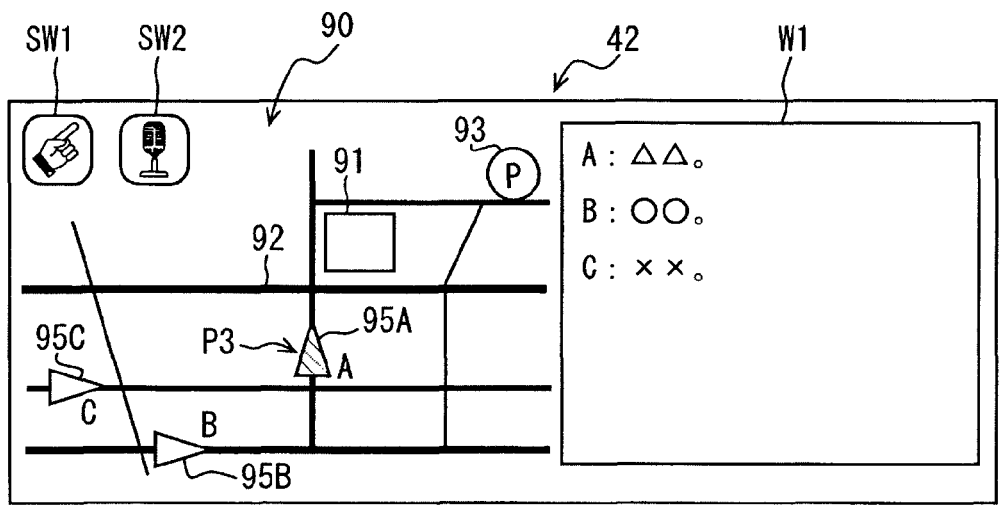
FIG. 9 is an example of a display screen of the message transmitting and receiving apparatus shown in FIG. 1.

Hereafter, operations of each message transmitting and receiving apparatus 1 will be described, using as an example an instance in which the user A is the transmitter and the users B and C are the recipients. In other words, the message transmitting and receiving apparatus 1A is the transmitting terminal 1T. The message transmitting and receiving apparatuses 1B and 1C are the receiving terminals 1R. FIG. 9 shows an example of a screen displayed in the display 42 (referred to, hereinafter, as simply a display screen) of the message transmitting and receiving apparatus 1A.

A map image 90, a touch input switch SW1, a speech input switch SW2, and a message window W1 are displayed on the display screen. In the map image 90, the current position of the user A is at the center. Roads 92 and facilities 93 near the current position of the user A are also shown in the map image 90. The current position of the user A is indicated by an isosceles triangle mark 95A. The current positions of the other users B and C are indicated by marks 95B and 95C. For the marks 95B and 95C, a display format differing from the mark 95A indicating the position of the user A (such as in color or shape) is used. The respective user names (such as account names used for the chat) may be displayed near the marks 95A to 95C indicating the respective positions of the users A to C. As a result, the user A can identify the position of each user A to C.

In the first example, the map scale of the map image 90 is set by an operation by the user A. However, the map scale setting is not limited thereto. The control unit 20 may automatically control the map scale and the display area such that the marks 95A to 95C indicating the respective current positions of all users A to C participating in the chat are displayed. In this instance, the display position of the mark 95A is not necessarily required to be near the center of the map image 90. Data for drawing the map image 90 is read out from the map data and the facility data stored in the storage unit 50. In addition, the range of the data to be read out may be determined based on the set map scale and display area.

The transmitted and received messages are displayed in chronological order in the message window W1. In the example in FIG. 9, each message is displayed together with the name of the user who has transmitted the message.

The touch input switch SW1 and the speech input switch SW2 are both software switches (referred to, hereinafter, as simply switches) for performing operations when the user A starts message input. In other words, when the control unit 20 detects that the switch SW1 or SW2 has been touched, the control unit 20 starts acquisition of the message. The touch input switch SW1 is selected when the user A inputs a message via the touch panel 32. When the control unit 20 detects that the touch input switch SW1 has been touched, the control unit 20 displays switches displaying characters, such as hiragana or the alphabet, in the display 42.

Figure 10:
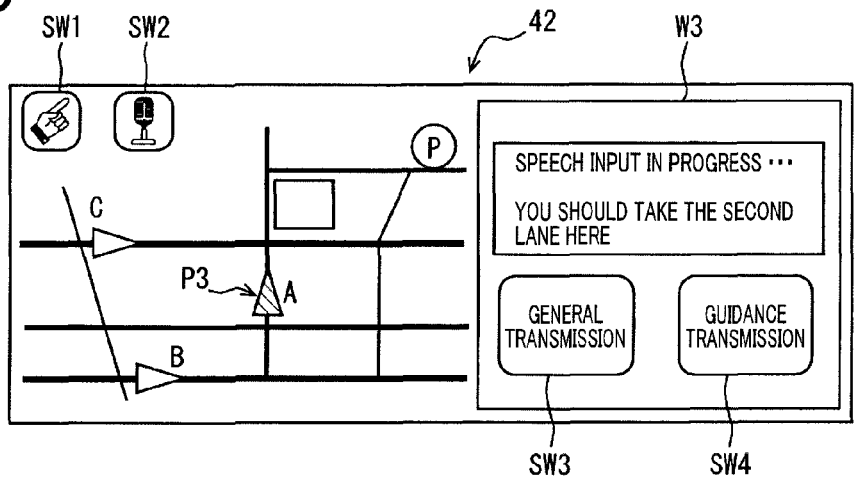
FIG. 10 is an example of a screen that is displayed on the display screen shown in FIG. 9 when a message is inputted via a microphone.

In addition, the speech input switch SW2 is selected when the user A inputs a message via the microphone 31. When the control unit 20 detects that the speech input switch SW2 has been touched, the control unit 20 starts collecting sound using the microphone 31. The electrical signals corresponding to the sounds acquired by the microphone 31 are converted to a message using a known speech analysis technology. FIG. 10 shows an example of a screen that is displayed when the speech input switch SW2 is touched and a message is inputted via the microphone 31.

As shown in FIG. 10, when the control unit 20 detects that the speech input switch SW41 has been touched, the control unit 20 displays a speech input window W3 in the display 42 instead of the message window W1. In the speech input window W3, the message inputted up to this point is displayed. The speech input window W3 allows the user A to check that the message is inputted correctly. According to the first embodiment, a configuration is used in which the message is inputted by the speech input switch SW2 being touched. However, the configuration is not limited thereto. A mechanical switch for starting speech input may be separately provided on the steering wheel or the like. The message may then be acquired from sound data collected by the microphone 31 while the mechanical switch is being pressed.

In the speech input window W3, a general transmission switch SW3 and a guidance transmission switch SW4 are displayed. The general transmission switch SW3 is selected when re-notification of the inputted message is not desired. When the control unit 20 detects that the general transmission switch SW3 has been touched, the control unit 20 determines that re-notification of the message inputted by the user A is not required and transmits the message. In other words, the control unit 20 performs processing so that the setting that re-notification is not required is made at step S11 in the transmission process shown in FIG. 3 (NO at step S12).

The guidance transmission switch SW4 is selected when re-notification of the inputted message to the vehicle traveling such as to track the own vehicle is desired. When the control unit 20 detects that the guidance transmission switch SW4 has been touched, the control unit 20 sets that re-notification of the message inputted by the user A is required and transmits the message. In other words, the control unit 20 sets that re-notification is required at step S11 in FIG. 3 (YES at step S12) and sets the re-notification condition at step S13. The re-notification condition that is set when the guidance transmission switch SW4 is touched uses the location information, azimuth angle, and cruising mode. More specifically, the control unit 20 sets the following as the re-notification conditions:

with the position of the transmitting terminal 1T at the time of message input as the set location, the distance from the set location to the receiving terminal 1R is within a predetermined distance (such as 50 m), the azimuth angle of the transmitting terminal 1T at the time of transmission is equivalent to the azimuth angle of the receiving terminal 1R, and the receiving terminal 1R is in tracking cruising mode.

In addition, the re-notification frequency is set to once and the validity period is set to one hour. These values may be designed accordingly. The control unit 20 generates the transmission data including the re-notification conditions. The control unit 20 then transmits the transmission data to the other users B and C that configure the group.

Here, for example, the user A inputs a message "You should take the second lane here" via the microphone 31 and touches the guidance transmission switch SW4. The position of the user A (in other words, the message transmitting and receiving apparatus 1A) at this time is P3. The azimuth angle is northward. In other words, the re-notification condition is that the position of the receiving terminal 1R is within 50 m from the set location P3, the azimuth angle is northward, and the cruising mode is tracking cruising mode.

Figure 11:
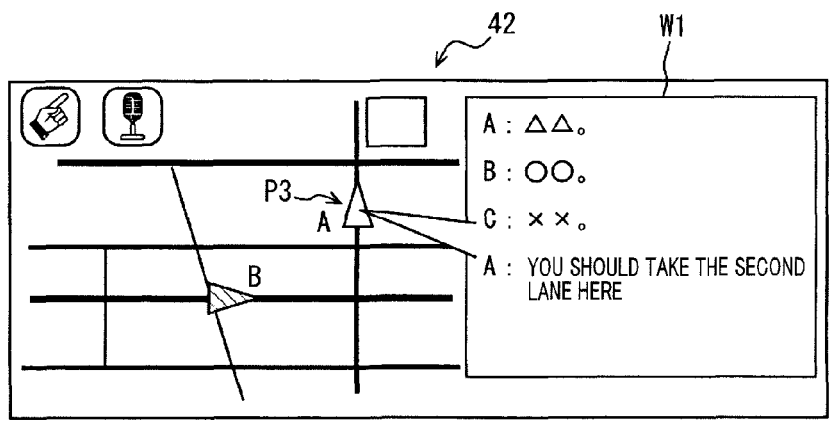
FIG. 11 is an example of the display screen shown in FIG. 9 in a message transmitting and receiving apparatus on a receiving side.

The display screen displayed in the display 42 is described in detail using the example of the display screen of the message transmitting and receiving apparatus 1A. However, the display screen is similarly configured in the other message transmitting and receiving apparatuses 1B and 1C as well. FIG. 11 shows an example of the display screen in the message transmitting and receiving apparatus 1B. In a manner similar to the display screen in the message transmitting and receiving apparatus 1A, the map image 90, the touch input switch SW1, the speech input switch SW2, and the message window W1 are displayed. However, regarding the map image 90, on the display screen of the message transmitting and receiving apparatus 1B, the current position of the user B is displayed near the center of the map image 90 and displayed using a mark that differs from the marks indicating the positions of the other users A and C.

Next, the operation of the message transmitting and receiving apparatus 1B when the transmission data transmitted from the message transmitting and receiving apparatus 1A is received will be described. When the transmission data transmitted from the message transmitting and receiving apparatus 1A is received, as shown in FIG. 11, the message "You should take the second lane here" is displayed on the display screen of the message transmitting and receiving apparatus 1B, together with the name A of the transmitter (step S20 in FIG. 6). Then, the control unit 20 determines whether or not re-notification is required at step S21. Here, because the setting is that re-notification of the message is required, the control unit 20 determines YES at step S22 and proceeds to step S23. At step S23, the control unit 20 associates the re-notification conditions and the message, and stores the re-notification conditions and the message in the re-notification list L1.

Figure 8:
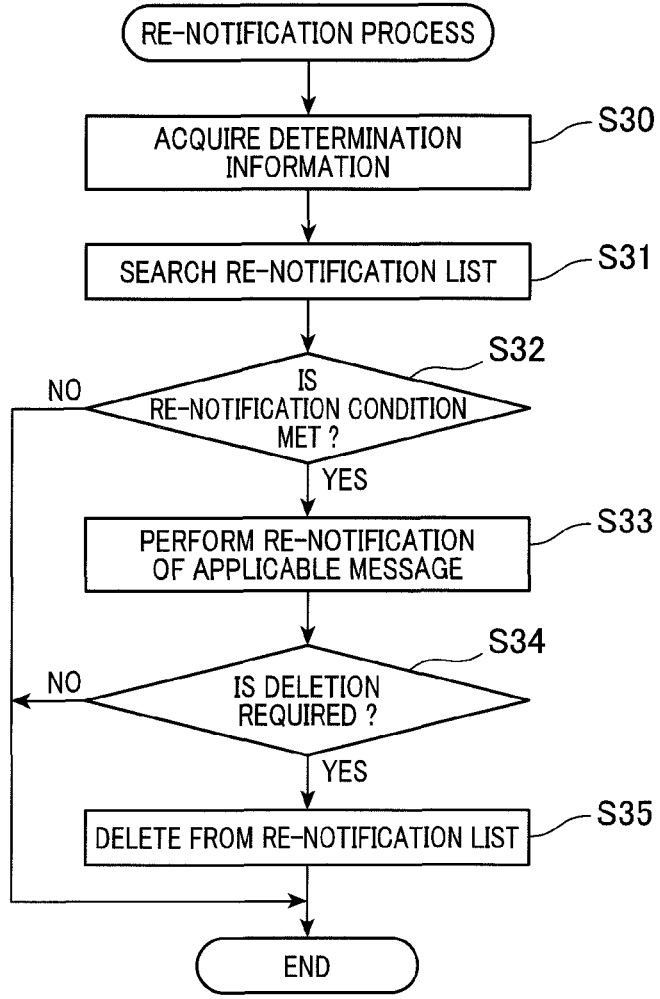
FIG. 8 is a flowchart showing a flow of a re-notification process performed by the control unit shown in FIG. 1.

Then, the control unit 20 of the message transmitting and receiving apparatus 1B successively performs the re-notification process shown in FIG. 8. As the re-notification conditions of the above-described message, the position information, azimuth angle, and cruising mode are used. Therefore, as the determination information, the control unit 20 acquires the current position, azimuth angle, and cruising mode of the message transmitting and receiving apparatus 1B. Then, the control unit 20 successively calculates the distance between the set location P3 and the current location that has been set as the re-notification condition. The control unit 20 determines whether or not the distance is within a predetermined distance. In addition, the control unit 20 determines whether or not the azimuth angle matches the azimuth angle in the re-notification condition.

Figure 12:
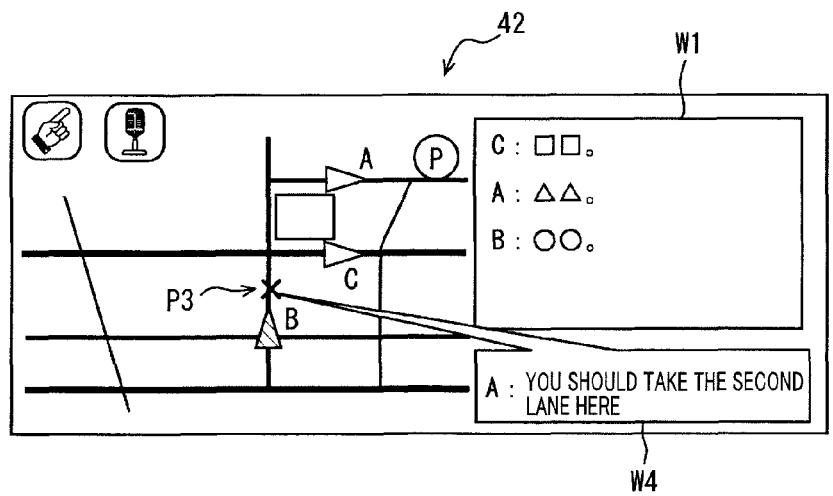
FIG. 12 is a diagram for describing an instance in which re-notification of a message is performed on the display screen shown in FIG. 9.

FIG. 12 shows the display screen of the message transmitting and receiving apparatus 12 after time has elapsed from the time point in FIG. 11 and the position of the user B is approaching the set location P3. At the time point shown in FIG. 12, the message transmitting and receiving apparatus 1B serving as the receiving terminal 1R is traveling northward within a predetermined distance from the set location P3. In addition, as described above, the message transmitting and receiving apparatus 1B is in tracking cruising mode. Therefore, the re-notification conditions of the message transmitted by the user A are met. As a result, the control unit 20 determines YES at step S32 and performs re-notification of the message "You should take the second lane here".

The message of which re-notification is performed is displayed in a message window (referred to as a re-notification window) W4 that differs from the message window W1 in which the received messages are displayed. At this time, because the location information is used as the re-notification condition, the set location P3 and the re-notification message window W4 are displayed in the display 42 such that the location to which the message pertains is visually understandable. For example, the setting location P3 and the re-notification message window W4 may be displayed such as to be connected by a connecting line. In addition, the sound of the message is outputted from the speaker 41. The user B is thereby re-notified (step S33). The re-notification frequency of the message transmitted using the guidance transmission switch SW4 is once. Therefore, the control unit 20 deletes the message from the re-notification list L1 when re-notification is completed (step S35).

In addition, the operation performed by the message transmitting and receiving apparatus 1C when the transmission data transmitted from the message transmitting and receiving apparatus 1A is received will be described. When the transmission data transmitted from the message transmitting and receiving apparatus 1A is received, in a manner similar to the message transmitting and receiving apparatus 1B, the message transmitting and receiving apparatus 1C displays the message transmitted from the user A in the message window W1. In addition, the sound is outputted from the speaker 41. The user C is thereby notified (step S20 in FIG. 6). Then, the control unit 20 associates the re-notification conditions and the message, and stores the re-notification conditions and the message in the re-notification list L1. The control unit 20 successively performs the re-notification process shown in FIG. 8.

However, the user C is not in tracking cruising mode. The user C is traveling in independent cruising mode which uses the route guidance function included in the own message transmitting and receiving apparatus 1C. Therefore, even when the message transmitting and receiving apparatus 1C approaches the set location P3 of the message transmitted by the user A and the azimuth angles match, re-notification is not performed (NO at step S32). When the validity period (one hour) ends, the control unit 20 deletes the message from the re-notification list L1.

As described above, the condition (re-notification condition) for performing re-notification of the message is set. Information having high correlation with the content of the message is used as the re-notification condition. As a result, the user can be re-notified of the message in a situation in which the information contained in the message becomes more useful. As a result, the user can reconfirm the content of the message at a more suitable timing than at reception. User convenience can be improved.

In addition, a condition that restricts the subject to receive re-notification (the tracking cruising mode, herein) is added to the re-notification condition. As a result, the risk of a user who does not require re-notification being re-notified of the message and experiencing annoyance can be reduced.

According to the first embodiment, a configuration is used in which the re-notification flag 82F is referenced. Depending on whether or not the setting is that re-notification of the message is required, whether or not to add the message to the re-notification list L1 is determined. However, the configuration is not limited thereto. When the re-notification flag 82F is set to indicate that re-notification is required, the re-notification conditions may be further referenced. As a result, whether or not re-notification to the own terminal is required is determined.

For example, in the instance in the first example, the message transmitting and receiving apparatus 1C is traveling in independent cruising mode. Therefore, the re-notification condition that the receiving terminal 1R is in tracking cruising mode is not met. During the reception process, the message transmitting and receiving apparatus 1C references the re-notification conditions. Because the tracking cruising mode is included in the re-notification conditions, the message transmitting and receiving apparatus 1C may thereby determine that re-notification to the own terminal is not required (NO at step S22). In this instance, the message from the user A is not added to the re-notification list L1. Unnecessary re-notification processes are no longer performed.

In addition to the general transmission switch SW3 and the guidance transmission switch SW4, the screen that appears when a message is inputted may be provided with a switch that is selected when re-notification to all users in the group is desired (referred to as a re-notification switch). For example, a message such as "A car is parked on the side of the road here" includes information that is not preset in a typical navigation device. Such messages are useful regardless of cruising mode.

Regarding re-notification conditions that are expected to be set frequently, a switch for setting the re-notification condition with a single operation may be provided for each of these re-notification conditions. In this instance, user operation on the transmitting side can be simplified. Convenience can be improved. The switches for setting the re-notification conditions may be set according to user preferences.

(Second Usage Example of the Message Transmitting and Receiving Apparatus According to the First Embodiment)

In the first example, an example is described in which re-notification conditions for a single location is set. However, the re-notification condition using location information may involve a wider area. In other words, the message transmitting and receiving apparatus 1 according to the first embodiment can be applied to situations in which notification is given of a warning within a certain area. An example thereof will be described with reference to FIG. 13.

Figure 13A:
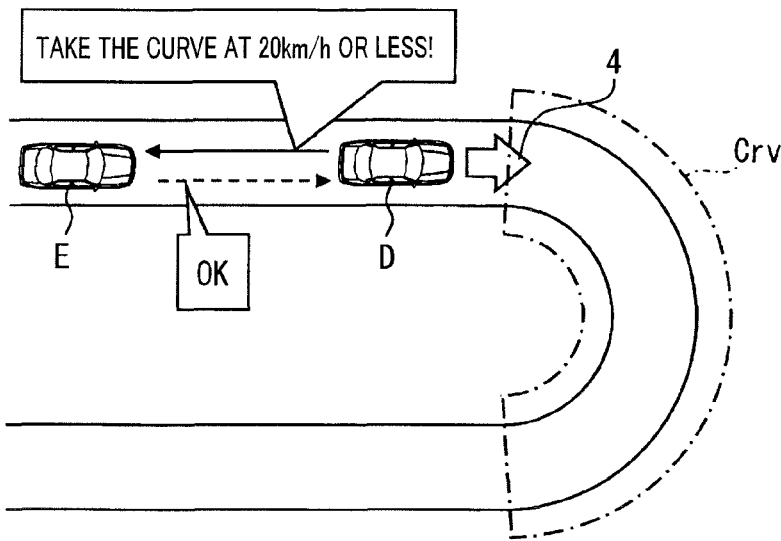
FIGS. 13A, 13B and 13C are conceptual diagrams for describing operations of the message transmitting and receiving apparatus when an area is designated as a re-notification condition according to the first embodiment.
Figure 13B:
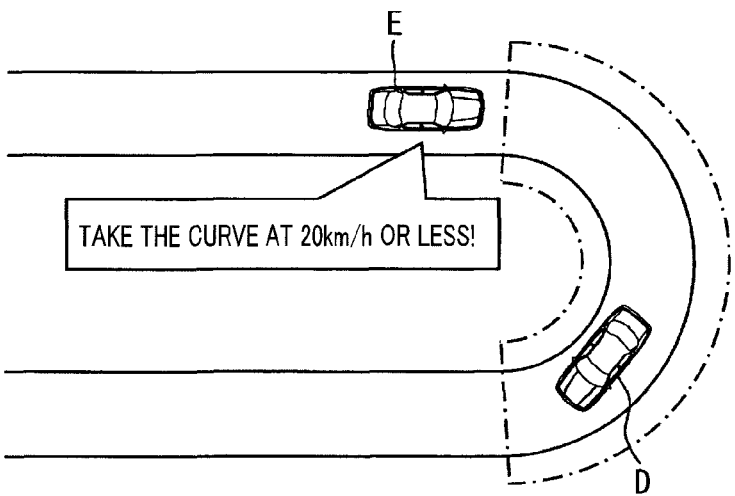
Figure 13C:
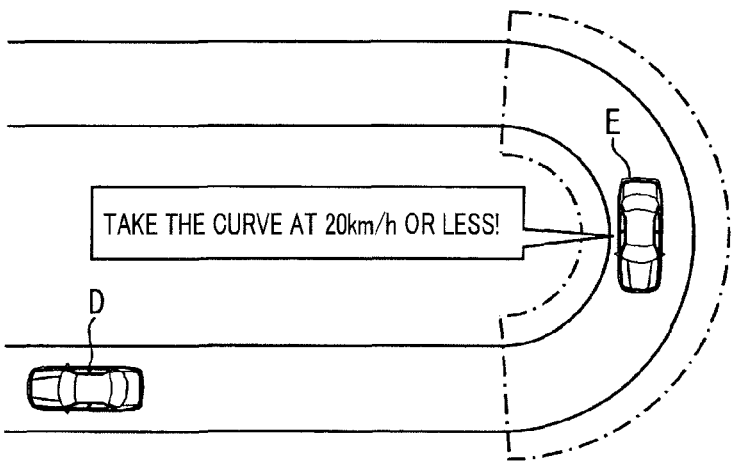

A message transmitting and receiving apparatus 1 is mounted in each of the vehicle D and the vehicle E shown in FIGS. 13A, 13B, and 13C. A user D is driving the vehicle D and a user E is driving the vehicle E (for convenience, the user is given the same reference number as the vehicle). The user D and the user E are transmitting and receiving messages to and from each other. The vehicle D is traveling in the direction of the white arrow 4. The vehicle E is a following vehicle of the vehicle D. The vehicle E is traveling in the same direction as the vehicle D. The road on which the vehicle D and the vehicle E are traveling includes an area that forms a sharp curve (referred to as a curved area) Cry. More specifically, the road on which the vehicle D and the vehicle E are traveling is shaped to form a straight road, the curved area Crv, and a straight road, in order from that closest to the vehicle D and vehicle R in the traveling direction. FIG. 13A, FIG. 13B, and FIG. 13C are aligned in chronological order. At the time point in FIG. 13A, the vehicle D and the vehicle E are both traveling on the straight road before the curved area Crv.

FIG. 13A shows a situation in which the user D sends a message "Take the curve at 20 km/h or less" to the user E. The user D thereby communicates a warning regarding the curved area Crv that is to be traveled. More specifically, the user D inputs the message into the message transmitting and receiving apparatus 1 mounted in the vehicle D, via the microphone 31. The message is set as that requiring re-notification. As the re-notification conditions of the message, a condition "approaching the curved area Crv" and a condition "the traveling speed when traveling the curved area Crv exceeds 20 km/h" are set as logical AND conditions.

The method for designating the curved area Crv in the control unit 20 may be, for example, the curved area Crv being touched and traced in the map image 90 displayed in the display 42. The area to be used as the location information is thereby designated in the control unit 20. Other designating methods may also be used. For example, the control unit 20 may automatically set the area by extracting an area corresponding to "the curve" from the shape of the road on which the vehicle D is expected to travel. The re-notification frequency at this time is set to unlimited and the validity period is set to one hour. Transmission data including the inputted message and the re-notification conditions is generated and transmitted to the message transmitting and receiving apparatus 1 mounted in the vehicle E.

The message transmitting and receiving apparatus 1 that is mounted in the vehicle E that has received the transmitted data notifies the user E of the message included in the transmission data, based on the reception process. In response to the message, the user E returns a reply such as "OK" to the user D. As a result, real-time communication is performed.

Thereafter, as shown in FIG. 13B, when the vehicle E approaches the curved area Crv and the condition "approaching the curved area Crv" is met, re-notification of the message is performed. Whether or not the vehicle E has approached the curved area Crv may be determined by the current position of the vehicle E being successively acquired from the GPS sensor 71. The distance to the starting point of the curved area Crv is then compared. As a result of re-notification being performed near the curved area Crv, the user E can reconfirm that the curved area Crv should be traveled with sufficient deceleration (in other words, 20 km/h or less).

In addition, an instance in which the traveling speed of the vehicle E exceeds 20 km/h while traveling the curved area Crv is shown in FIG. 13C. The traveling speed may be successively acquired from the vehicle speed sensor 74 via the in-vehicle LAN 80. Whether or not the acquired traveling speed is greater that 20 km/h may then be determined. In addition, whether or not the vehicle E is traveling through the curved area Crv is determined from the current position. When the vehicle E is traveling through the curved area Crv and the traveling speed exceeds 20 km/h, the re-notification conditions are considered to be met. Re-notification is performed. At this time, a pop-up may be displayed in the display 42 every time the re-notification conditions are met. Because the re-notification frequency is set to unlimited, re-notification is performed every time the re-notification conditions are met.

Therefore, as a result of the message transmitting and receiving apparatus 1 according to the first embodiment being applied even in situations where notification is given of a warning within a certain area, notification of the warning is given at the timing in which caution is required. Therefore, the driver can be made more aware of the warning.

(Third Usage Example of the Message Transmitting and Receiving Apparatus According to the First Embodiment)

A process for notification and re-notification of a message in chat format between predetermined users configuring a group is described above. However, the present invention is not limited thereto. The present invention may be applied to a system in which notification and re-notification of messages are performed among an unspecified number of users (referred to as a notification system for an unspecified number).

The notification system for an unspecified number includes a plurality of message transmitting and receiving apparatuses 1A to 1C. Each of the message transmitting and receiving apparatuses 1A to 1C is mounted in a vehicle. The users of the message transmitting and receiving apparatuses 1A to 1C are respectively A to C. As indicated by the solid lines 3 in FIG. 2, the message transmitting and receiving apparatuses 1A to 1C each communicate with the server SRV and successively transmit position information of the own terminal 1 to the server SRV.

The notification system for an unspecified number is as follows. A message is inputted by the user of the message transmitting and receiving apparatus 1 serving as the transmitting terminal 1T. An operation for transmitting the message to the other message transmitting and receiving apparatuses 1 is performed. Here, the message transmitting and receiving apparatus 1 serving as the transmitting terminal 1T transmits the transmission data including the message to the server SRV. Then, the transmission data is transferred to the other message transmitting and receiving apparatuses 1 present near the transmitting terminal 1T.

The other message transmitting and receiving apparatus 1 present near the transmitting terminal 1T receives the transmission data. The other message transmitting and receiving apparatus 1 then associates the transmission data with the position of the transmitting terminal 1T. The other message transmitting and receiving apparatus 1 displays the message included in the transmission data in the display 42. As a result, notification is given to the respective users. Hereafter, the operation of the notification system for an unspecified number will be described in further detail. Here, the message transmitting and receiving apparatus 1A operates as the transmitting terminal 1T. The message transmitting and receiving apparatuses 1B and 1C operate as the receiving terminals 1R.

First, at a certain time point, the user A inputs a message of caution "Be careful of the step on the left side". The user A then sets that re-notification of the message to the other terminals 1 is required and transmits the message. Whether or not re-notification of the message is required may be set by a switch being displayed on the screen. The switch is selected when re-notification of the inputted message is required (referred to as a caution transmission switch). When the caution transmission switch is touched, the message is set as requiring re-notification. The message is then transmitted.

As the re-notification conditions set by the control unit 20, the location information and the azimuth angle of the message transmitting and receiving apparatus 1A at the time of transmission are used. In other words, when the position of the message transmitting and receiving apparatus 1A at the time of transmission is P4, the re-notification condition is that the distance between the set location P4 and the receiving terminal 1R is within a predetermined distance. In addition, the azimuth angle of the receiving terminal 1R is equivalent to the azimuth angle of the message transmitting and receiving apparatus 1A at the time of transmission.

Figure 3:
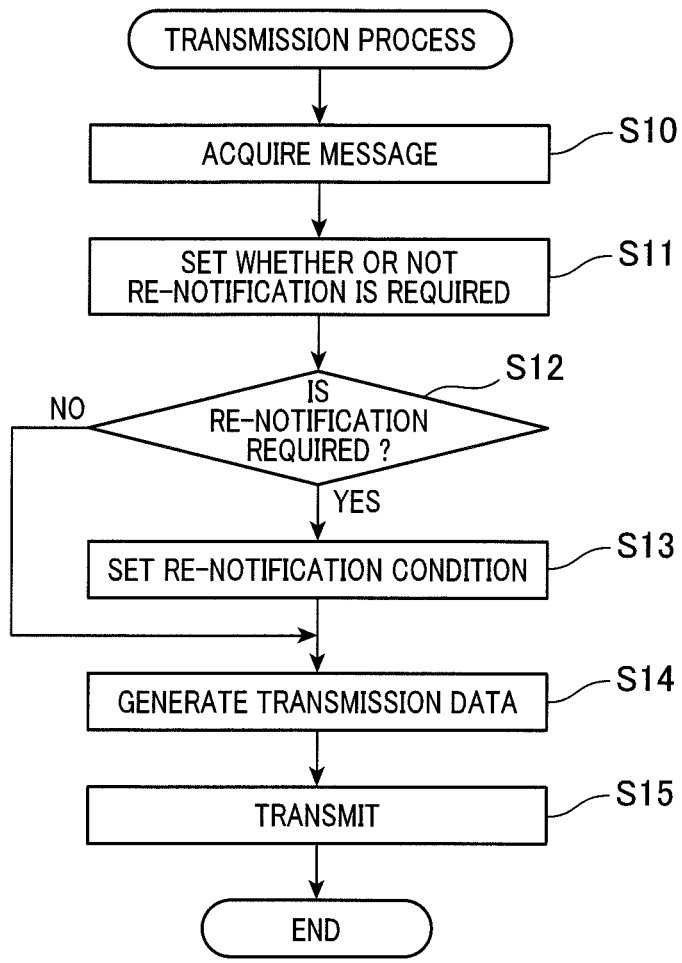
FIG. 3 is a flowchart showing a flow of a transmission process performed by a control unit shown in FIG. 1.

Then, the control unit 20 of the message transmitting and receiving apparatus 1A generates the transmission data based on the transmission process shown in FIG. 3 and transmits the transmission data to the server SRV. When the transmission data from the message transmitting and receiving apparatus 1A is received, the server SRV searches for other terminals present in the periphery of the message transmitting and receiving apparatus 1A. Here, the periphery refers to an area within a 300 meter radius of the message transmitting and receiving apparatus 1A. However, this is not limited thereto. For example, the area may be determined based on the traveling speed of the message transmitting and receiving apparatus 1A. For example, the area considered to be in the periphery of the message transmitting and receiving apparatus 1A may be set to widen as the traveling speed of the message transmitting and receiving apparatus 1A increases.

Here, the message transmitting and receiving apparatuses 1B and 1C correspond with the terminals 1 present in the periphery of the message transmitting and receiving apparatus 1A. Therefore, the server SRV transfers the transmission data to the message transmitting and receiving apparatuses 1B and 1C.

Figure 14A:
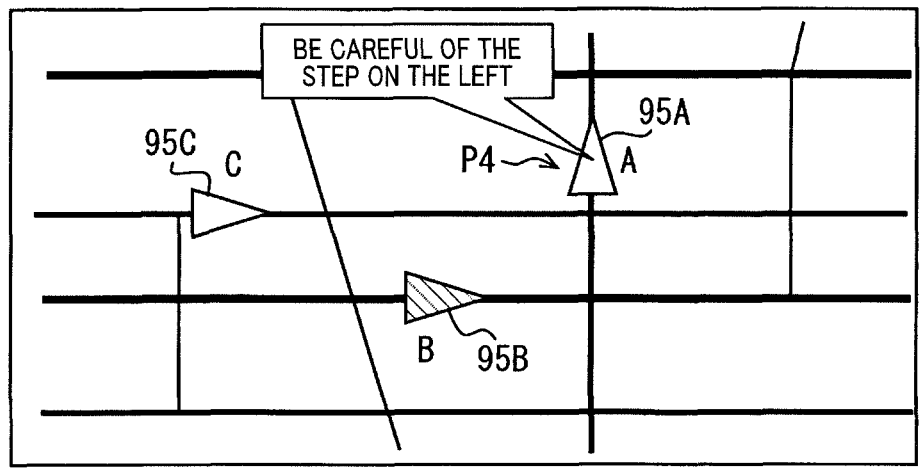
FIGS. 14A and 14B are conceptual diagrams for describing an example of a display screen of the message transmitting and receiving apparatus when the message notification system is applied to a notification system for an unspecified number of users according to the first embodiment.

FIG. 14A is an example of a display screen in the display 42 of the message transmitting and receiving apparatus 1B when the transmission data transmitted by the message transmitting and receiving apparatus 1A is received by the message transmitting and receiving apparatus 1B. In the display screen, a map image in which the position of the user B (specifically, the message transmitting and receiving apparatus 1B) is disposed near the center is displayed. In addition, the positions of the users (A, B, and C) present within the area of the displayed map image are displayed.

More specifically, isosceles triangle marks 95A to 95C in FIG. 14A indicate the positions of the users A to C. The direction of the apex of the isosceles triangle indicates the traveling direction (in other words, the azimuth angle) of the user. The mark 95B indicating the position of the own terminal 1B is displayed by using a display format differing from the other marks 95A and 95C. As a result, the mark indicating the own terminal 1B can be differentiated from the marks indicating the positions of the other users A and C.

As shown in FIG. 14A, when the transmission data transmitted by the user A is received, the message transmitting and receiving apparatus 1B associates the message included in the transmission data with the current position P4 of the user A and displays the message. The user B is thereby notified of the message.

Figure 14B:
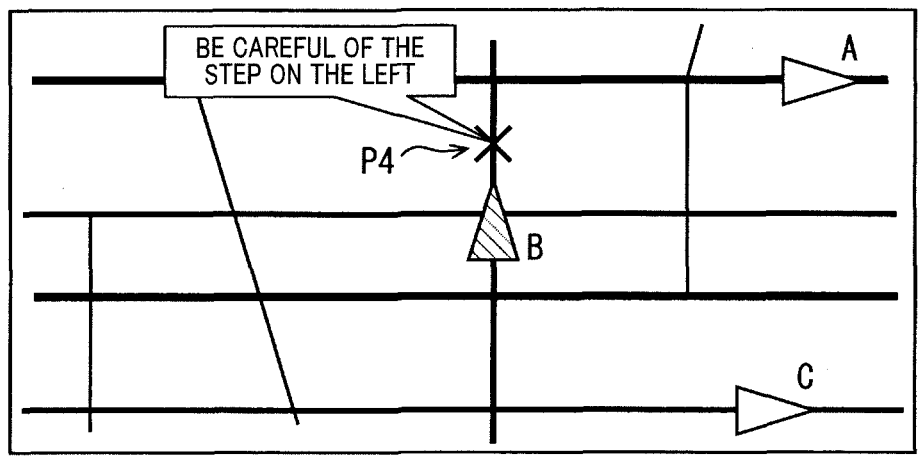

A state after time has elapsed and the user B is approaching the set location P4 is shown in FIG. 14B. At the time point shown in FIG. 14B, the user B is within the predetermined distance from the set location P4. In addition, the azimuth angle of the user B is equivalent to the azimuth angle of the message transmitting and receiving apparatus 1A at the time of transmission. In other words, the re-notification conditions for the message transmitted by the user A are met. Therefore, re-notification of the message from the user A is performed. As a result, re-notification of the same message is performed at a timing that is more effective than the timing of the initial notification. Therefore, the user can travel with the reconfirmation that a step is present on the left side of the road being traveled.

As described above, even in the notification system for an unspecified number of users in which the transmitter and the recipients do not form a particular group, re-notification of the message transmitted by the transmitter is performed at a time point at which the value of the information contained in the message is increased. Therefore, user convenience can be improved.

Second Embodiment

According to the first embodiment, an instance is described in which the communication format of the message notification system 100 is a so-called push-type format. In the push-type format, the transmission process for the message from the transmitting terminal 1T is the starting point of the communication. The message is then received by the receiving terminal 1R. However, the communication format is not limited thereto.

The communication format of the message notification system 100 may be a so-called pull-type format. In the pull-type format, the receiving side becomes the starting point of communication. The message is received from the server SRV. Here, as an example of the message notification system 100 being applied to a pull-type application, a following system is described. In the system, an operator of a facility provides information for assisting a visitor of the facility in driving to the facility (facility visitor driving assistance system).

Figure 15:
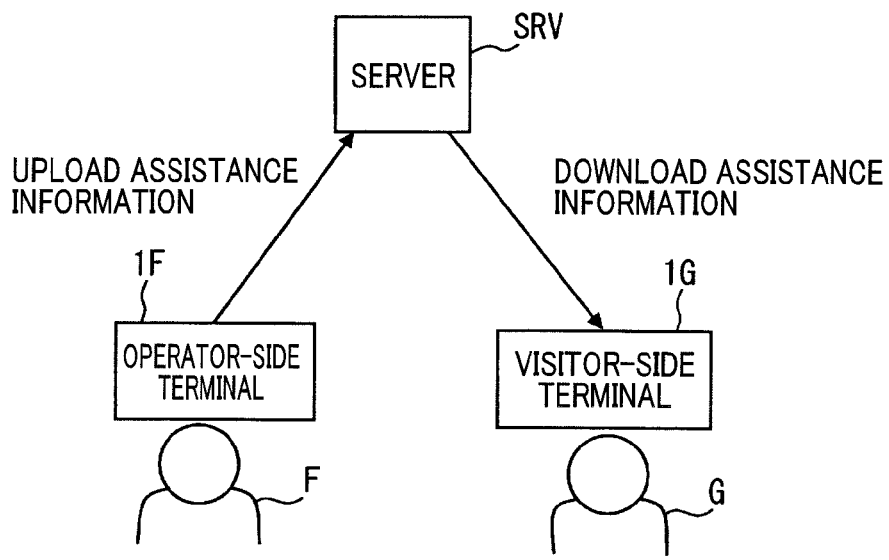
FIG. 15 is a block diagram of a configuration of a driving assistance system for a facility visitor according to a second embodiment.

As shown in FIG. 15, the facility visitor driving assistance system includes an operator-side terminal 1F, the server SRV, and a visitor-side terminal 1G. The operator-side terminal 1F, the server SRV, and the visitor-side terminal 1G use wireless communication and wired communication accordingly. A network is thereby constructed that enables access to one another.

The visitor-side terminal 1G is mounted in a vehicle. The vehicle is driven by a visitor G. The visitor-side terminal 1G includes the communication unit 10, the control unit 20, the input unit 30, the output unit 40, the storage unit 50, and the detecting unit 70, described according to the first embodiment. However, the control unit 20 included in the visitor-side terminal 1G does not include the transmission processing unit 20T. The control unit 20 mainly includes the reception processing unit 20R, the navigating unit 20N, and function for performing the re-notification process. Therefore, the visitor-side terminal 1G is equivalent to a message receiving apparatus recited in the present disclosure.

The operator-side terminal 1F is a known computer that is operated by an operator F of a certain facility Z. The operator-side terminal 1F includes the communication unit 10, the control unit 20, the input unit 30, the output unit 40, the storage unit 50, and the detecting unit 70, described according to the first embodiment. However, the control unit 20 included in the operator-side terminal 1F does not include the reception processing unit 20R. The control unit 20 mainly includes the transmission processing unit 20T and the navigating unit 20N. Therefore, the operator-side terminal 1F is equivalent to a message transmitting apparatus recited in the present disclosure.

The operator F uploads assistance information to the server SRV via the operator side terminal 1F. The assistance information includes: route information from a certain location (such as the nearest train station St to the facility Z) to the facility Z; a message of which notification is to be given to the facility visitor G at an arbitrary location on the route; and the re-notification condition for the message. If there are a plurality of messages of which notification is to be given to the facility visitor G, the re-notification condition is set for each message.

Figure 16:
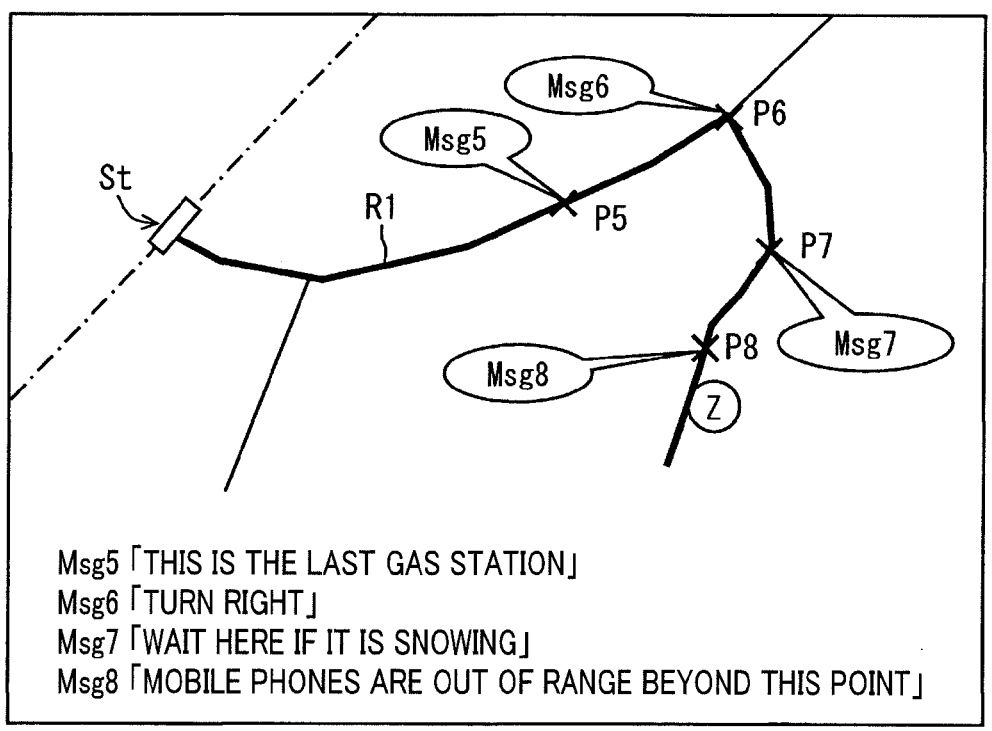
FIG. 16 is a conceptual diagram for describing assistance information.

FIG. 16 is a conceptual diagram for describing an example of the assistance information. Reference number R1 in FIG. 16 indicates the route from the nearest train station St to the facility Z. Reference numbers P5 to P8 indicate locations to which messages Msg5 to Msg8 are respectively registered. A re-notification condition is set for each of the messages Msg5 to Msg8. An example of the content and re-notification condition of each message Msg5 to Msg8 is as follows:

Message Msg5

Content: "This is the last gas station"

Re-notification condition: when all of the following (i) to (iii) are met (i) Route R1 is being used, (ii) The remaining amount of gasoline is a certain amount (such as half) or less, or the remaining amount of gasoline is unknown, and (iii) The distance between the position of the visitor-side terminal 1 and the set location P5 is a predetermined distance (100 m) or less.

Message Msg6

Content: "Turn right"

Re-notification condition: when both of the following (i) and (ii) are met
(i) Route R1 is being used, and
(ii) The distance between the position of the visitor-side terminal 1 and the set location P6 is a predetermined distance (100 m) or less.

Message Msg7
Content: "Wait here if it is snowing"
Re-notification condition: when all of the following (i) to (iii) are met
(i) Route R1 is being used,
(ii) The weather is snowing or unknown, and
(iii) The distance between the position of the visitor-side terminal 1 and the set location P7 is a predetermined distance (100 m) or less.

Message Msg8
Content: "Mobiles phones are out of range beyond this point"
Re-notification condition: when both of the following (i) and (ii) are met
(i) Route R1 is being used, and
(ii) The distance between the position of the visitor-side terminal 1 and the set location P8 is a predetermined distance (100 m) or less.

For the remaining amount of gasoline used in the re-notification condition for message Msg5, the visitor-side terminal 1G may acquire the remaining amount of gasoline via the in-vehicle LAN 80. In addition, the weather may be inputted before the start of traveling by the user G. Alternatively, a configuration is possible in which the visitor-side terminal 1G holds weather information as internal information as a result of the server SRV delivering the weather information to the visitor-side terminal 1G. Here, an example is described in which the remaining amount of gasoline is used as the vehicle information in the re-notification condition. However, the vehicle information is not limited thereto.

The re-notification condition may be set using vehicle information such as those described according to the first embodiment. In addition, an example is described in which the weather is used as the external information in the re-notification condition. However, other types of external information may be used. For example, a time period (such as from 8 a.m. to 10 a.m.) may be set as the re-notification condition for messages such as "Be careful of traffic jams in the morning".

The server SRV stores therein the assistance information in association with the facility Z. The assistance information is uploaded by the operator F. In addition, when the visitor-side terminal 1G requests the assistance information related to the facility Z, the server SRV transmits the assistance information to the visitor-side terminal 1G. Before starting travel to visit the facility Z, the visitor G operates the visitor-side terminal 1G and downloads the assistance information related to the facility Z.

The visitor-side terminal 1G that has acquired the assistance information sets the route from the current position to the facility Z using the route R1 included in the assistance information. Depending on the current location of the visitor G, not all segments of the route R1 are necessarily used. When a portion of the route R1 is used, the navigating unit 20N performs route calculation such as to combine the route from the current position to the facility Z calculated by the navigating unit 20N, and the route R1.

In addition, when the assistance information is downloaded, the visitor-side terminal 1G displays the messages Msg5 to Msg8 in the display 42. The messages Msg5 to Msg8 are respectively registered to the locations P5 to P8 on the route R1. For example, as shown in FIG. 16, the overall image of route R1 may be displayed. Alternatively, the image may be scrolled along the route R1 from the nearest station St to the facility Z, and displayed. The message may then be displayed in association with the set location at the timing at which the set location is displayed. The messages and re-notification conditions included in the assistance information are stored in the re-notification list L1 of the visitor-side terminal 1G.

Then, when the visitor G starts driving, the visitor-side terminal 1G successively performs the re-notification process shown in FIG. 8. A message of which the re-notification condition has been met is displayed in the display 42. The user G is notified of the message. Notification may also be performed by the message being outputted by sound from the speaker 41.

As described above, the message notification system 100 can be applied to a facility visitor driving assistance system. User convenience can be improved in pull-type services.

Third Embodiment

According to the first embodiment, an instance is described in which the message transmitting and receiving apparatus 1 is mounted in a vehicle. However, the present invention is not limited thereto.

A known multi-function mobile phone (referred to, hereinafter, as simply a mobile phone) may be used as the message transmitting and receiving apparatus 1. In other words, a program may be installed in the storage unit 50, such as a memory included in the mobile phone. The program enables a computer included in the mobile phone to operate as the message transmitting and receiving apparatus 1. In addition to mobile phones, other known mobile terminals, such as a portable music players and tablet terminals having a communication function, can be used as the message transmitting and receiving apparatus 1.

A mobile phone 1 serving as the message transmitting and receiving apparatus 1 includes the communication unit 10, the control unit 20, the input unit 30, the output unit 40, the storage unit 50, and the detecting unit 70, in a manner similar to the above-described message transmitting and receiving apparatus 1. In addition, a program enabling the control unit 20 of the mobile phone 2 to operate as the message transmitting and receiving apparatus 1 is installed in an RAM (not shown) or the like of the control unit 20. Here, for convenience, among the configurations related to functions provided by a typical mobile phone, configurations that are not necessary for description of the present invention are omitted from the description.

Figure 17A:
FIGS. 17A, 17B, and 17C are diagrams for describing an operation example when the message transmitting and receiving apparatus according to a third embodiment is actualized by a mobile phone.
Figure 17B:
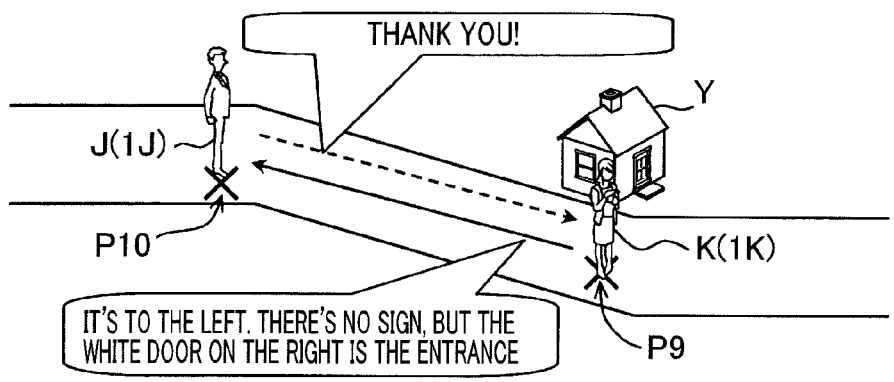
Figure 17C:
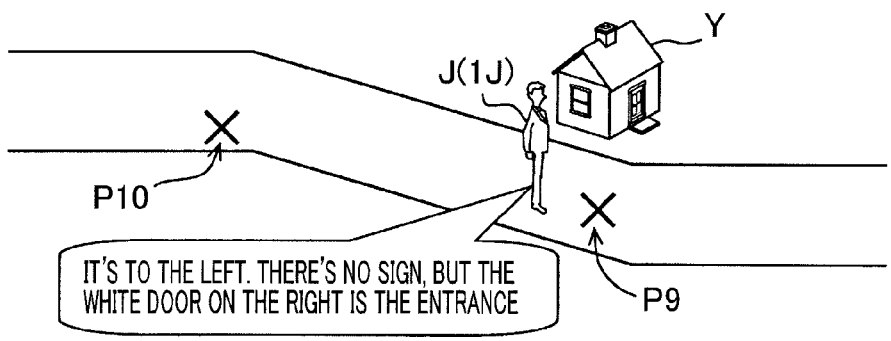

Hereafter, an example will be described in which a known mobile phone is used as the message transmitting and receiving apparatus 1 with reference to FIGS. 17A, 17B and 17C. Users J and K shown in FIGS. 17A, 17B, and 17C respectively carry mobile phones 1J and 1K that operate as the message transmitting and receiving apparatus 1. The user J is attempting to visit a store Y. However, the user J does not know the specific position of the store Y. The user K knows the specific position of the store Y. In addition, the user K is planning on passing in front of the store Y. FIGS. 17A, 17B, and 17C are aligned in chronological order. The exchange of messages between the user J and the user K at each time point is indicated.

At the time point in FIG. 17A, the user J operates the mobile phone 1J to find the specific position of the store Y. The user J inputs a message "Does anybody know of a store Y near here?" into the mobile phone 1J. The mobile phone 1J of the user J then transmits the message with the setting that re-notification is not required. The transmission data transmitted from the mobile phone 1J carried by the user J is received by other mobile phones 1 that are present near the user J. The transmission data is received by P2P communication or via the server SRV. Here, among the users carrying the other mobile phones present near the user J, the mobile phone 1K of the user K responds to the message transmitted by the mobile phone 1J of the user J. The user K who has checked the message from the mobile phone 1J of the user J inputs a message "I do. It's right up ahead" into the mobile phone 1K. The mobile phone 1K of the user K sets that re-notification is not required and replies to the mobile phone 1J of the user J.

A state in which time has elapsed and the user K has arrived in front of the store Y (location P9) is shown in FIG. 17B. At this time, the user K inputs the message "It's to the left. There's no sign, but the white door on the right is the entrance" into the mobile phone 1K. The mobile phone 1K of the user K sets the re-notification of this message to be required and transmits the message to the mobile phone 1J of the user J.

For example, the control unit 20 displays the guidance transmission switch SW4, such as that shown in FIG. 10, on the message input screen. When the guidance transmission switch SW4 has been touched, the control unit 20 may transmit the message with the setting that re-notification is required. In addition, location information is used as the re-notification condition. The re-notification condition is that the distance between the location P9 and the position of the mobile phone 1J is a predetermined distance (such as 10 m). In addition, when the message indicating the specific location is received from the mobile phone 1K of the user K, the user J inputs a message such as "Thank you!" into the mobile phone 1J. The message is transmitted with the setting that re-notification is not required. The position of the mobile phone 1J of the user J at this time is P10.

As a result of the messages being transmitted and received in real-time in this way, the user K can confirm that the user J has understood the content of the message transmitted by the user K himself. In addition, the user J can know the detailed location of the store Y with no difficulty.

A state in which the user J has further moved and is approaching the location P9, or in other words, the distance between the position of the mobile phone 1J and the location P is within 10 m is shown in FIG. 17C. At this time, the re-notification condition of the message transmitted by the user K is met. Therefore, the control unit 20 of the mobile phone 1J re-notifies the user J of the message using the display 42 and the speaker 41, based on the flow of the re-notification process. The user J is able to reconfirm, from the message of which re-notification has been received, that the store Y that the user J is looking for is near the current position.

As described above, re-notification of the message "It's to the left . . . " is performed at location P9. The location P9 has a relatively stronger correlation with the content of the message than location P10. Therefore, the message is more useful to the user. In addition, as a result of re-notification being performed near the location P9 that is in front the store Y, the risk of the user J passing by the store Y can be reduced.

Examples in which the location information is used as the re-notification condition are mainly described above. However, this is not limited thereto. For example, the re-notification condition may be set using only information related to time, such as "I'll be home at 7 p.m.", without use of the location information. In addition, messages such as "Be careful of the curve" may be transmitted such that re-notification is performed when the yaw rate is a certain value or more, without use of the location information.

A plurality of embodiments of the present invention are described above. However, the present invention is not limited to the above-described embodiments. Various embodiments and combinations are possible without departing from the scope of the present invention.

What is claimed is:

1. A message notification system comprising:
a message transmitting apparatus; and
a message receiving apparatus,
the message transmitting apparatus including:
    message input means that enables a transmitting-side user to input a message;
    message acquiring means that acquires the message inputted by the transmitting-side user via the message input means;
    transmission data generating means that generates transmission data including the message;
    transmitting means that transmits the transmission data generated by the transmission data generating means;
    first setting means that sets whether nor not a receiving-side user is to be re-notified of the message included in the transmission data; and
    second setting means that sets, when the first setting means sets that the receiving-side user is to be re-notified of the message, a re-notification condition that is a condition for re-notification of the message, and is a condition that is correlated with a content of the message and is used to determine a state in which the message becomes more useful than at the time of message transmission, the transmission data further including data indicating whether or not re-notification is required that is set by the first setting means and data indicating the re-notification condition when the first setting means sets that the receiving-side user is to be re-notified of the message,
the message receiving apparatus including:
    receiving means that receives the transmission data transmitted by the message transmitting apparatus;
    first message notifying means that notifies, when the receiving means receives the transmission data, a receiving-side user of the message included in the transmission data received by the receiving means;
    first storage means that stores, when the receiving means receives the transmission data with the setting that re-notification is required, the message included in the transmission data in association with the re-notification condition of the message;
    determining means that determines whether or not the re-notification condition stored in the first storage means is met; and
    second message notifying means that re-notifies the receiving-side user of the message of which the determining means has determined that the re-notification condition is met,
wherein the second setting means uses position information as the re-notification condition, the position information indicating a set location that is set based on an input of the transmitting-side user or a predetermined rule.

2. The message notification system according to claim 1, wherein
the second setting means includes, in the re-notification condition, a condition that a distance between the set position and a position of the message receiving apparatus is a predetermined distance or less.

3. The message notification system according to claim 2, wherein:
the message transmitting apparatus further includes second storage means for storing a re-notification table that stores at least one re-notification identifier composed of one or more codes; and
the first setting means determines whether or not the re-notification identifier stored in the re-notification table is included in the message inputted by the transmitting-side user, and if the re-notification identifier is included in the message, sets that the receiving-side user is to be re-notified of the message.

4. The message notification system according to claim 3, wherein:
the re-notification table stores the re-notification identifier in association with the re-notification condition related to the re-notification identifier; and
the second setting means refers to the re-notification table and the message inputted by the transmitting-side user, and sets the re-notification condition of the message to the re-notification condition associated with the message inputted by the transmitting-side user.

5. The message notification system according to claim 4, wherein
the re-notification condition includes a validity period of the message.

6. The message notification system according to claim 5, further comprising:
detecting means that detects a physical quantity belonging to a predetermined type,
the second setting means using, as the re-notification condition, a comparison between an output value of the detecting means and a predetermined threshold value.

7. The message notification system according to claim 6, wherein
the re-notification condition includes a condition indicating an upper limit of a re-notification frequency of the message in which the re-notification condition is set.

8. A message notification system comprising:
a message transmitting apparatus; and
a message receiving apparatus,
the message transmitting apparatus including:
message input means that enables a transmitting-side user to input a message;
message acquiring means that acquires the message inputted by the transmitting-side user via the message input means;
transmission data generating means that generates transmission data including the message;
transmitting means that transmits the transmission data generated by the transmission data generating means;
first setting means that sets whether nor not a receiving-side user is to be re-notified of the message included in the transmission data; and
second setting means that sets, when the first setting means sets that the receiving-side user is to be re-notified of the message, a re-notification condition that is a condition for re-notification of the message, and is a condition that is correlated with a content of the message and is used to determine a state in which the message becomes more useful than at the time of message transmission, the transmission data further including data indicating whether or not re-notification is required that is set by the first setting means and data indicating the re-notification condition when the first setting means sets that the receiving-side user is to be re-notified of the message,
the message receiving apparatus including:
receiving means that receives the transmission data transmitted by the message transmitting apparatus;
first message notifying means that notifies, when the receiving means receives the transmission data, a receiving-side user of the message included in the transmission data received by the receiving means;
first storage means that stores, when the receiving means receives the transmission data with the setting that re-notification is required, the message included in the transmission data in association with the re-notification condition of the message;
determining means that determines whether or not the re-notification condition stored in the first storage means is met; and
second message notifying means that re-notifies the receiving-side user of the message of which the determining means has determined that the re-notification condition is met,
wherein:
the message transmitting apparatus further includes second storage means for storing a re-notification table that stores at least one re-notification identifier composed of one or more codes; and
the first setting means determines whether or not the re-notification identifier stored in the re-notification table is included in the message inputted by the transmitting-side user, and if the re-notification identifier is included in the message, sets that the receiving-side user is to be re-notified of the message.

9. A message notification system comprising:
a message transmitting apparatus; and
a message receiving apparatus,
the message transmitting apparatus including:
message input means that enables a transmitting-side user to input a message;
message acquiring means that acquires the message inputted by the transmitting-side user via the message input means;
transmission data generating means that generates transmission data including the message;
transmitting means that transmits the transmission data generated by the transmission data generating means;
first setting means that sets whether nor not a receiving-side user is to be re-notified of the message included in the transmission data; and
second setting means that sets, when the first setting means sets that the receiving-side user is to be re-notified of the message, a re-notification condition that is a condition for re-notification of the message, and is a condition that is correlated with a content of the message and is used to determine a state in which the message becomes more useful than at the time of message transmission, the transmission data further including data indicating whether or not re-notification is required that is set by the first setting means and data indicating the re-notification condition when the first setting means sets that the receiving-side user is to be re-notified of the message,
the message receiving apparatus including:
receiving means that receives the transmission data transmitted by the message transmitting apparatus;
first message notifying means that notifies, when the receiving means receives the transmission data, a receiving-side user of the message included in the transmission data received by the receiving means;

first storage means that stores, when the receiving means receives the transmission data with the setting that re-notification is required, the message included in the transmission data in association with the re-notification condition of the message;

determining means that determines whether or not the re-notification condition stored in the first storage means is met; and second message notifying means that re-notifies the receiving-side user of the message of which the determining means has determined that the re-notification condition is met, wherein the re-notification condition includes a validity period of the message.

10. A message notification system comprising:
a message transmitting apparatus; and
a message receiving apparatus,
the message transmitting apparatus including:
message input means that enables a transmitting-side user to input a message;

message acquiring means that acquires the message inputted by the transmitting-side user via the message input means;

transmission data generating means that generates transmission data including the message;

transmitting means that transmits the transmission data generated by the transmission data generating means;

first setting means that sets whether nor not a receiving-side user is to be re-notified of the message included in the transmission data; and second setting means that sets, when the first setting means sets that the receiving-side user is to be re-notified of the message, a re-notification condition that is a condition for re-notification of the message, and is a condition that is correlated with a content of the message and is used to determine a state in which the message becomes more useful than at the time of message transmission, the transmission data further including data indicating whether or not re-notification is required that is set by the first setting means and data indicating the re-notification condition when the first setting means sets that the receiving-side user is to be re-notified of the message, the message receiving apparatus including:
receiving means that receives the transmission data transmitted by the message transmitting apparatus;

first message notifying means that notifies, when the receiving means receives the transmission data, a receiving-side user of the message included in the transmission data received by the receiving means;

first storage means that stores, when the receiving means receives the transmission data with the setting that re-notification is required, the message included in the transmission data in association with the re-notification condition of the message;

determining means that determines whether or not the re-notification condition stored in the first storage means is met; and second message notifying means that re-notifies the receiving-side user of the message of which the determining means has determined that the re-notification condition is met, the message notification system further comprising
detecting means that detects a physical quantity belonging to a predetermined type, the second setting means using, as the re-notification condition, a comparison between an output value of the detecting means and a predetermined threshold value.

11. A message notification system comprising:
a message transmitting apparatus; and
a message receiving apparatus,
the message transmitting apparatus including:
message input means that enables a transmitting-side user to input a message;

message acquiring means that acquires the message inputted by the transmitting-side user via the message input means;

transmission data generating means that generates transmission data including the message;

transmitting means that transmits the transmission data generated by the transmission data generating means;

first setting means that sets whether nor not a receiving-side user is to be re-notified of the message included in the transmission data; and second setting means that sets, when the first setting means sets that the receiving-side user is to be re-notified of the message, a re-notification condition that is a condition for re-notification of the message, and is a condition that is correlated with a content of the message and is used to determine a state in which the message becomes more useful than at the time of message transmission, the transmission data further including data indicating whether or not re-notification is required that is set by the first setting means and data indicating the re-notification condition when the first setting means sets that the receiving-side user is to be re-notified of the message, the message receiving apparatus including:
receiving means that receives the transmission data transmitted by the message transmitting apparatus;

first message notifying means that notifies, when the receiving means receives the transmission data, a receiving-side user of the message included in the transmission data received by the receiving means;

first storage means that stores, when the receiving means receives the transmission data with the setting that re-notification is required, the message included in the transmission data in association with the re-notification condition of the message;

determining means that determines whether or not the re-notification condition stored in the first storage means is met; and second message notifying means that re-notifies the receiving-side user of the message of which the determining means has determined that the re-notification condition is met, wherein the re-notification condition includes a condition indicating an upper limit of a re-notification frequency of the message in which the re-notification condition is set.

12. A message transmitting and receiving apparatus comprising:
a message transmitting apparatus; and
a message receiving apparatus,
the message transmitting apparatus including:
message input means that enables a transmitting-side user to input a message;

message acquiring means that acquires the message inputted by the transmitting-side user via the message input means;

transmission data generating means that generates transmission data including the message;

transmitting means that transmits the transmission data generated by the transmission data generating means;

first setting means that sets whether nor not a receiving-side user is to be re-notified of the message included in the transmission data; and second setting means that sets, when the first setting means sets that the receiving-side user is to be re-notified of the message, a re-notification condition that is a condition for re-notification of the message, and is a condition that is correlated with a content of the message and is used to determine a state in which the message becomes more useful than at the time of message transmission, the transmission data further including data indicating whether or not re-notification is required that is set by the first setting means and data indicating the re-notification condition when the first setting means sets that the receiving-side user is to be re-notified of the message, the message receiving apparatus including:

receiving means that receives the transmission data transmitted by the message transmitting apparatus;

first message notifying means that notifies, when the receiving means receives the transmission data, a receiving-side user of the message included in the transmission data received by the receiving means;

first storage means that stores, when the receiving means receives the transmission data with the setting that re-notification is required, the message included in the transmission data in association with the re-notification condition of the message;

determining means that determines whether or not the re-notification condition stored in the first storage means is met; and second message notifying means that re-notifies the receiving-side user of the message of which the determining means has determined that the re-notification condition is met, wherein the second setting means uses position information as the re-notification condition, the position information indicating a set location that is set based on an input of the transmitting-side user or a predetermined rule.

13. A non-transitory computer-readable recording medium storing a program for causing a computer to function as:

message acquiring means that acquires a message inputted by a transmitting-side user;

transmission data generating means that generates transmission data including the message;

transmitting means that transmits the generated transmission data;

receiving means that receives the transmission data;

first message notifying means that notifies, when the receiving means receives the transmission data, a receiving-side user of the message included in the transmission data received by the receiving means;

first setting means that sets whether nor not the receiving-side user is to be re-notified of the message included in the transmission data;

second setting means that sets, when the first setting means sets that the receiving-side user is to be re-notified of the message, a re-notification condition that is a condition for re-notification of the message, and is a condition that is correlated with a content of the message and is used to determine a state in which the message becomes more useful than at the time of message transmission, the transmission data further including data indicating whether or not re-notification is required that is set by the first setting means and data indicating the re-notification condition when the first setting means sets that the receiving-side user is to be re-notified of the message;

determining means that determines whether or not the re-notification condition is met; and second message notifying means that re-notifies the receiving-side user of the message of which the determining means has determined that the re-notification condition is met, wherein the second setting means uses position information as the re-notification condition, the position information indicating a set location that is set based on an input of the transmitting-side user or a predetermined rule.

\* \* \* \* \*